(12) United States Patent
Gronvall et al.

(10) Patent No.: US 8,213,761 B2
(45) Date of Patent: Jul. 3, 2012

(54) MINI DROP TERMINAL

(75) Inventors: Erik Gronvall, Bloomington, MN (US); Paula Rudenick, Eden Prairie, MN (US); Yu Lu, Eden Prairie, MN (US)

(73) Assignee: ADC Telecommunications, Eden Prairie, MN (US)

( * ) Notice: Subject to any disclaimer, the term of this patent is extended or adjusted under 35 U.S.C. 154(b) by 0 days.

(21) Appl. No.: 12/955,701

(22) Filed: Nov. 29, 2010

(65) Prior Publication Data
US 2011/0067452 A1    Mar. 24, 2011

Related U.S. Application Data

(62) Division of application No. 12/248,564, filed on Oct. 9, 2008, now Pat. No. 7,844,158.

(60) Provisional application No. 60/978,638, filed on Oct. 9, 2007.

(51) Int. Cl.
*G02B 6/00* (2006.01)
*G02B 6/36* (2006.01)

(52) U.S. Cl. ............. 385/135; 385/76; 385/77; 385/139

(58) Field of Classification Search .................... 385/76, 385/77, 134–137, 139
See application file for complete search history.

(56) References Cited

U.S. PATENT DOCUMENTS

| | | | |
|---|---|---|---|
| 4,453,291 A | 6/1984 | Fidrych | |
| 4,478,486 A | 10/1984 | Fentress et al. | |
| 4,648,168 A | 3/1987 | Nolf et al. | |
| 4,652,072 A | 3/1987 | Arasi, Jr. | |
| 4,684,221 A | 8/1987 | Takada | |
| 4,685,764 A | 8/1987 | Hoffer et al. | |
| 4,717,231 A | 1/1988 | Dewez et al. | |
| 4,744,622 A | 5/1988 | Cherry et al. | |
| 4,761,052 A | 8/1988 | Buekers et al. | |
| 4,805,979 A | 2/1989 | Bossard et al. | |

(Continued)

FOREIGN PATENT DOCUMENTS
EP    0 511 147 A1    10/1992
(Continued)

OTHER PUBLICATIONS

ADC Telecommunications, Above Ground Cross-Connect (AGX) Fiber Panel (AGX-1000HD) User Manual; 26 pp.; ADCP-93-010 Issue 2, Jul. 1997.

(Continued)

*Primary Examiner* — Daniel Petkovsek
(74) *Attorney, Agent, or Firm* — Merchant & Gould P.C.

(57) ABSTRACT

A terminal for mounting to a fiber distribution cable includes a housing having a base and a cover. The cover is connectedly engaged with the base. The terminal further includes a plurality of adapters disposed on the cover. A fiber routing tray having a top panel and a bottom panel is disposed in an interior cavity. The fiber routing tray includes a storage space defined between the top and bottom panels for storing a length of optical fiber. A method for installing a terminal includes providing a terminal having a housing defining an interior cavity. A cable is pulled from the interior cavity of the housing. The cable is spliced to a fiber distribution cable with a splice. The cable is inserted back into the interior cavity. A spliced end of the cable, a spliced end of the fiber distribution cable and the splice are inserted in a retention device.

10 Claims, 24 Drawing Sheets

U.S. PATENT DOCUMENTS

| | | | |
|---|---|---|---|
| 4,838,643 A | 6/1989 | Hodges et al. | |
| 4,908,482 A | 3/1990 | Shimirak et al. | |
| 4,913,522 A | 4/1990 | Nolf et al. | |
| 4,958,903 A | 9/1990 | Cobb et al. | |
| 4,986,762 A | 1/1991 | Keith | |
| 5,029,958 A | 7/1991 | Hodge et al. | |
| 5,046,811 A | 9/1991 | Jung et al. | |
| 5,048,916 A | 9/1991 | Caron | |
| 5,076,656 A | 12/1991 | Briggs et al. | |
| 5,097,529 A | 3/1992 | Cobb et al. | |
| 5,097,530 A | 3/1992 | Holt et al. | |
| 5,122,069 A | 6/1992 | Brownlie et al. | |
| 5,129,030 A | 7/1992 | Petrunia | |
| 5,133,038 A | 7/1992 | Zipper | |
| 5,133,039 A | 7/1992 | Dixit | |
| 5,155,794 A | 10/1992 | Nolf et al. | |
| 5,185,845 A | 2/1993 | Jones | |
| 5,208,893 A | 5/1993 | McCall et al. | |
| 5,212,761 A | 5/1993 | Petrunia | |
| 5,214,735 A | 5/1993 | Henneberger et al. | |
| 5,222,183 A | 6/1993 | Daems et al. | |
| 5,231,687 A | 7/1993 | Handley | |
| 5,235,665 A | 8/1993 | Marchesi et al. | |
| 5,249,253 A | 9/1993 | Franckx et al. | |
| 5,267,122 A | 11/1993 | Glover et al. | |
| 5,278,931 A | 1/1994 | Antos et al. | |
| 5,323,480 A | 6/1994 | Mullaney et al. | |
| 5,363,465 A | 11/1994 | Korkowski et al. | |
| 5,367,598 A | 11/1994 | Devenish, III et al. | |
| 5,396,575 A | 3/1995 | Hayward et al. | |
| RE34,955 E | 5/1995 | Anton et al. | |
| 5,439,395 A | 8/1995 | Laukzemis | |
| 5,446,823 A | 8/1995 | Bingham et al. | |
| 5,479,533 A | 12/1995 | Tanaka | |
| 5,479,553 A | 12/1995 | Daems et al. | |
| 5,480,203 A | 1/1996 | Favalora et al. | |
| 5,509,099 A | 4/1996 | Hermsen et al. | |
| 5,515,472 A | 5/1996 | Mullaney et al. | |
| 5,525,756 A | 6/1996 | Mullaney et al. | |
| 5,535,298 A | 7/1996 | Fasnacht et al. | |
| D372,897 S | 8/1996 | Curry et al. | |
| 5,546,495 A | 8/1996 | Bruckner et al. | |
| 5,556,060 A | 9/1996 | Bingham et al. | |
| 5,566,268 A | 10/1996 | Radliff et al. | |
| 5,566,269 A | 10/1996 | Eberle, Jr. et al. | |
| 5,577,151 A | 11/1996 | Hoffer | |
| 5,602,954 A | 2/1997 | Nolf et al. | |
| 5,613,030 A | 3/1997 | Hoffer et al. | |
| 5,633,973 A | 5/1997 | Vincent et al. | |
| 5,634,822 A | 6/1997 | Gunnell | |
| 5,640,482 A | 6/1997 | Barry et al. | |
| 5,647,045 A | 7/1997 | Robinson et al. | |
| 5,659,650 A | 8/1997 | Arnett | |
| 5,661,841 A | 8/1997 | Van Noten | |
| 5,689,607 A | 11/1997 | Vincent et al. | |
| 5,692,299 A | 12/1997 | Daems et al. | |
| 5,701,380 A | 12/1997 | Larson et al. | |
| 5,732,180 A | 3/1998 | Kaplan | |
| 5,734,776 A | 3/1998 | Puetz | |
| 5,745,633 A | 4/1998 | Giebel et al. | |
| 5,754,723 A | 5/1998 | Fremgen | |
| 5,758,003 A | 5/1998 | Wheeler et al. | |
| 5,758,004 A | 5/1998 | Alarcon et al. | |
| 5,764,843 A | 6/1998 | Macken et al. | |
| 5,764,844 A | 6/1998 | Mendes | |
| 5,777,268 A | 7/1998 | Allen et al. | |
| 5,778,122 A | 7/1998 | Giebel et al. | |
| 5,781,678 A | 7/1998 | Sano et al. | |
| 5,790,740 A | 8/1998 | Cloud et al. | |
| 5,825,960 A | 10/1998 | Woodward et al. | |
| 5,828,807 A | 10/1998 | Tucker et al. | |
| 5,863,083 A | 1/1999 | Giebel et al. | |
| 5,879,197 A | 3/1999 | Dewey | |
| 5,886,300 A | 3/1999 | Strickler | |
| 5,892,870 A | 4/1999 | Fingler et al. | |
| 5,894,540 A | 4/1999 | Drewing | |
| 5,903,698 A | 5/1999 | Poremba et al. | |
| 5,907,653 A | 5/1999 | Burek et al. | |
| 5,911,027 A | 6/1999 | Macken et al. | |
| 5,917,648 A | 6/1999 | Harker | |
| 5,933,563 A | 8/1999 | Schaffer et al. | |
| 5,975,769 A | 11/1999 | Larson et al. | |
| 5,982,971 A | 11/1999 | Amirkalali | |
| 5,995,700 A | 11/1999 | Burek et al. | |
| RE36,592 E | 2/2000 | Giebel et al. | |
| 6,160,946 A | 12/2000 | Thompson et al. | |
| 6,167,183 A * | 12/2000 | Swain | 385/135 |
| 6,175,079 B1 | 1/2001 | Johnston et al. | |
| 6,208,796 B1 | 3/2001 | Williams Vigliaturo | |
| 6,215,939 B1 | 4/2001 | Cloud | |
| 6,250,816 B1 | 6/2001 | Johnston et al. | |
| 6,259,024 B1 | 7/2001 | Daoud | |
| 6,263,142 B1 | 7/2001 | Mardirossian et al. | |
| 6,275,639 B1 | 8/2001 | Bolt et al. | |
| 6,275,640 B1 | 8/2001 | Hunsinger et al. | |
| 6,292,614 B1 | 9/2001 | Smith et al. | |
| 6,300,562 B1 | 10/2001 | Daoud | |
| 6,363,200 B1 | 3/2002 | Thompson et al. | |
| 6,396,989 B1 | 5/2002 | Johnston et al. | |
| 6,424,782 B1 | 7/2002 | Ray | |
| 6,439,779 B1 | 8/2002 | Hafer | |
| 6,453,106 B1 | 9/2002 | Glaser et al. | |
| 6,476,327 B1 | 11/2002 | Bernard et al. | |
| 6,504,986 B1 | 1/2003 | Wambeke et al. | |
| 6,504,987 B1 | 1/2003 | Macken et al. | |
| 6,507,691 B1 | 1/2003 | Hunsinger et al. | |
| 6,535,682 B1 * | 3/2003 | Puetz et al. | 385/135 |
| 6,575,792 B2 | 6/2003 | Henneberger et al. | |
| 6,579,014 B2 | 6/2003 | Melton et al. | |
| 6,621,975 B2 | 9/2003 | Laporte et al. | |
| 6,648,520 B2 | 11/2003 | McDonald et al. | |
| 6,661,961 B1 | 12/2003 | Allen et al. | |
| 6,728,451 B2 | 4/2004 | Kordahi | |
| 6,760,531 B1 | 7/2004 | Solheid et al. | |
| 6,763,170 B2 | 7/2004 | Kordahi et al. | |
| 6,766,094 B2 | 7/2004 | Smith et al. | |
| 6,788,846 B2 | 9/2004 | Hileman et al. | |
| 6,804,447 B2 | 10/2004 | Smith et al. | |
| 6,880,986 B2 | 4/2005 | Mynatt et al. | |
| 6,899,467 B2 | 5/2005 | McDonald et al. | |
| 6,926,449 B1 | 8/2005 | Keenum et al. | |
| 6,993,237 B2 | 1/2006 | Cooke et al. | |
| 7,013,074 B2 * | 3/2006 | Battey et al. | 385/135 |
| 7,072,559 B2 | 7/2006 | Giordano et al. | |
| 7,120,347 B2 * | 10/2006 | Blackwell et al. | 385/135 |
| 7,142,764 B2 | 11/2006 | Allen | |
| 7,263,265 B2 | 8/2007 | Grubish et al. | |
| 7,292,763 B2 | 11/2007 | Smith et al. | |
| 7,298,952 B2 | 11/2007 | Allen | |
| 7,300,215 B2 | 11/2007 | Hsiao et al. | |
| 7,333,708 B2 | 2/2008 | Blackwell, Jr. et al. | |
| 7,340,145 B2 | 3/2008 | Allen | |
| 7,356,237 B2 | 4/2008 | Mullaney et al. | |
| 7,359,613 B2 * | 4/2008 | Mullaney et al. | 385/139 |
| 7,397,997 B2 | 7/2008 | Ferris et al. | |
| 7,400,815 B2 | 7/2008 | Mertesdorf et al. | |
| 7,480,437 B2 | 1/2009 | Ferris et al. | |
| 7,492,996 B2 | 2/2009 | Kowalczyk et al. | |
| 7,539,387 B2 | 5/2009 | Mertesdorf et al. | |
| 7,539,388 B2 | 5/2009 | Mertesdorf et al. | |
| 7,591,595 B2 | 9/2009 | Lu et al. | |
| 7,680,388 B2 | 3/2010 | Reagan et al. | |
| 2003/0072540 A1 | 4/2003 | Huang | |
| 2003/0077041 A1 | 4/2003 | Belaidi et al. | |
| 2003/0091315 A1 | 5/2003 | Allerellie | |
| 2003/0103750 A1 | 6/2003 | Laporte et al. | |
| 2004/0028368 A1 | 2/2004 | Hileman et al. | |
| 2004/0062508 A1 | 4/2004 | Blankenship et al. | |
| 2004/0211774 A1 | 10/2004 | Daoud et al. | |
| 2004/0240823 A1 | 12/2004 | Daoud | |
| 2005/0094959 A1 | 5/2005 | Sibley et al. | |
| 2005/0129375 A1 | 6/2005 | Elkins, II et al. | |
| 2005/0145522 A1 | 7/2005 | Bloodworth et al. | |
| 2005/0163448 A1 | 7/2005 | Blackwell, Jr. et al. | |
| 2005/0175307 A1 | 8/2005 | Battey et al. | |
| 2005/0175308 A1 | 8/2005 | Elkins, II et al. | |
| 2005/0185895 A1 | 8/2005 | Keenum et al. | |

| | | | |
|---|---|---|---|
| 2005/0186838 A1 | 8/2005 | Debenedictis et al. | |
| 2005/0213921 A1 | 9/2005 | Mertesdorf et al. | |
| 2005/0220421 A1 | 10/2005 | Keenum et al. | |
| 2006/0089049 A1 | 4/2006 | Sedor | |
| 2006/0093303 A1 | 5/2006 | Reagan et al. | |
| 2006/0098932 A1 | 5/2006 | Battey et al. | |
| 2006/0153517 A1* | 7/2006 | Reagan et al. | 385/135 |
| 2006/0285810 A1 | 12/2006 | Vanhentenrijk et al. | |
| 2007/0104448 A1 | 5/2007 | Allen | |
| 2007/0189694 A1* | 8/2007 | Mullaney et al. | 385/135 |
| 2008/0131068 A1 | 6/2008 | Mertesdorf et al. | |
| 2009/0123115 A1 | 5/2009 | Gronvall et al. | |

FOREIGN PATENT DOCUMENTS

| | | |
|---|---|---|
| EP | 0 805 536 A1 | 11/1997 |
| EP | 0 844 504 A2 | 5/1998 |
| EP | 0 851 257 A1 | 7/1998 |
| FR | 2 853 775 A1 | 10/2004 |
| JP | 58-105114 | 6/1983 |
| JP | 60-169813 | 9/1985 |
| JP | 9-15426 | 1/1997 |
| JP | 2006/215248 | 8/2006 |
| WO | WO 95/07478 | 3/1995 |
| WO | WO 02/06879 A1 | 1/2002 |
| WO | WO 2008/118603 A2 | 10/2008 |

OTHER PUBLICATIONS

ADC Telecommunications; Fiber Cable Management Products Third Edition; 22 pages; Jun. 1998.

ADC Telecommunications; Fiber Panel Products Second Edition; 16 pages; Jul. 1996.

ADC Telecommunications; FL1000 Wall-Mount Box Installation and Operation Guide; 28 pages; ADCP-90-334 Issue 1, Nov. 2004.

ADC Telecommunications; FL2000 Products; 6 pages; Nov. 1996.

ADC Telecommunications; FL2000™ Wall Mount Box Installation Instructions; 18 pages; ADCP-90-210 Issue 4; Jan. 1998.

ADC Telecommunications; FTD1 36-Fiber Wall Box User Manual; 15 pages; ADCP-90-250 Issue 1, Nov. 1996.

ADC Telecommunications; FTUA 4- and 12-Fiber Wall Box User Manual; 14 pages; ADCP-90-249 Issue 2, Mar. 1997.

ADC Telecommunications; Six-Fiber In-Building Wall Box Installation Instructions; 8 pages; ADCP-90-167 Issue 3, Nov. 1997.

ADC Telecommunications; Value-Added Module System; 8 pages; Jun. 1998.

ADC Telecommunications; Wall Mount Box 12/24/36 Fiber User Manual; 16 pages; ADCP-90-149 Issue 3, Jul. 1997.

* cited by examiner

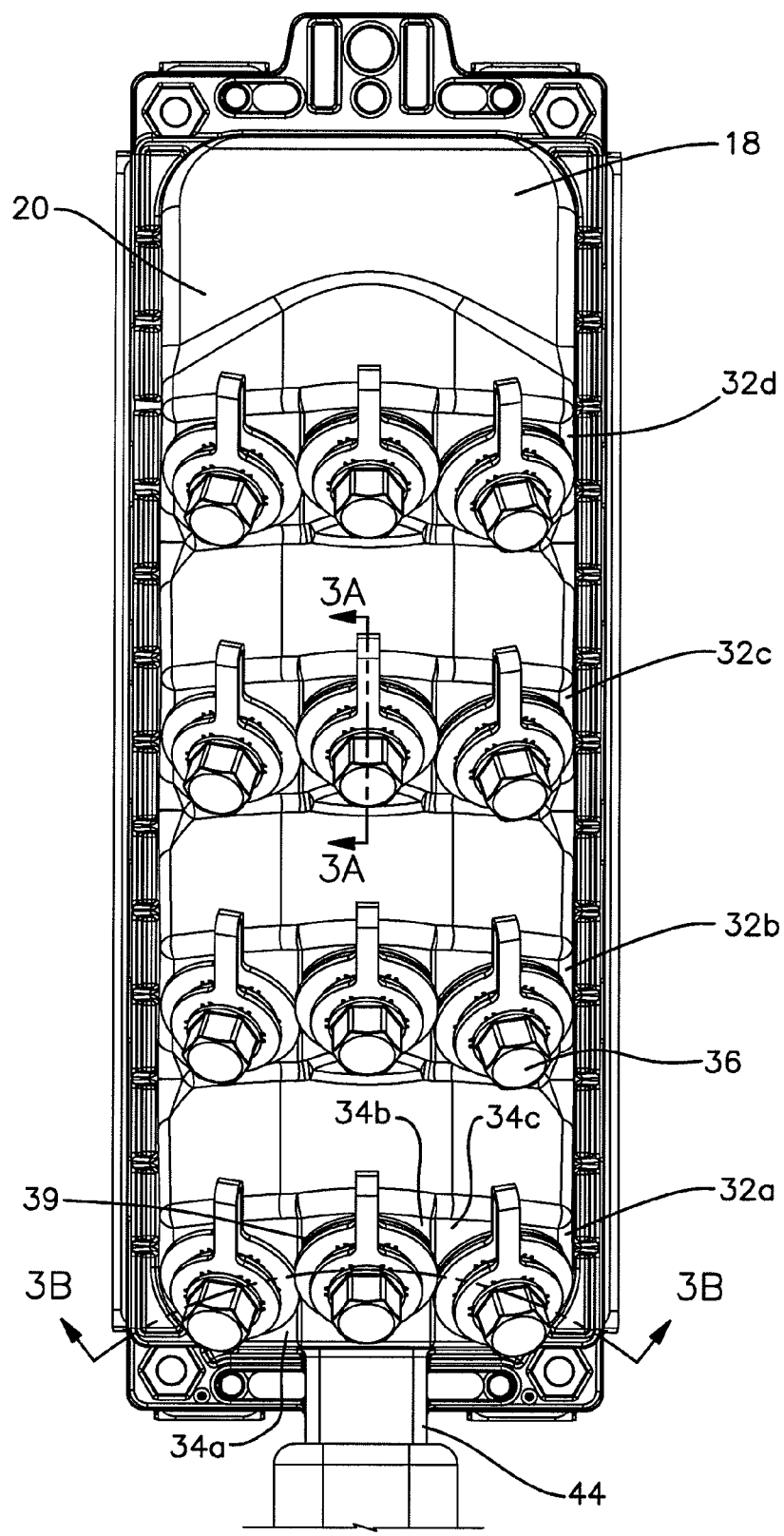

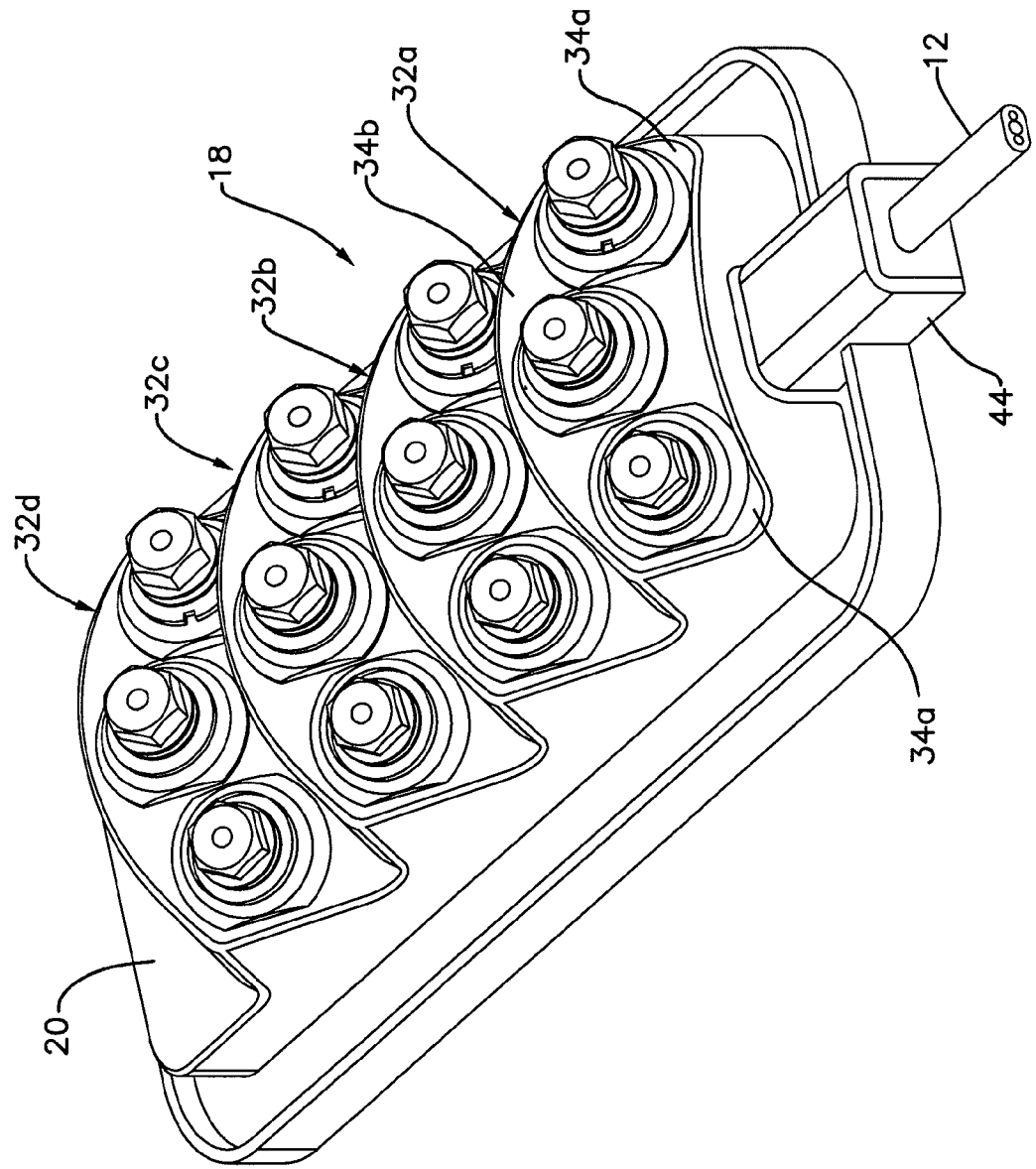

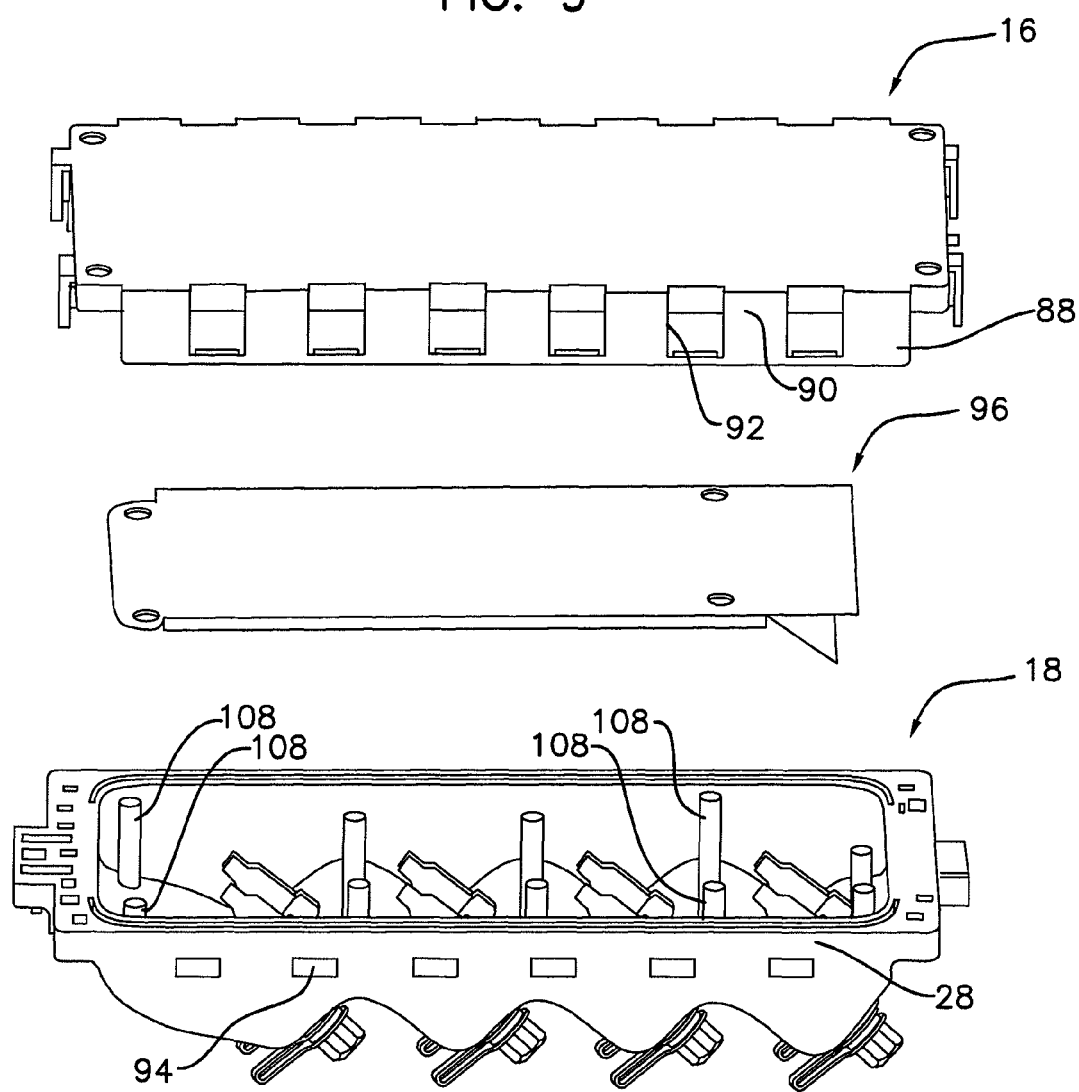

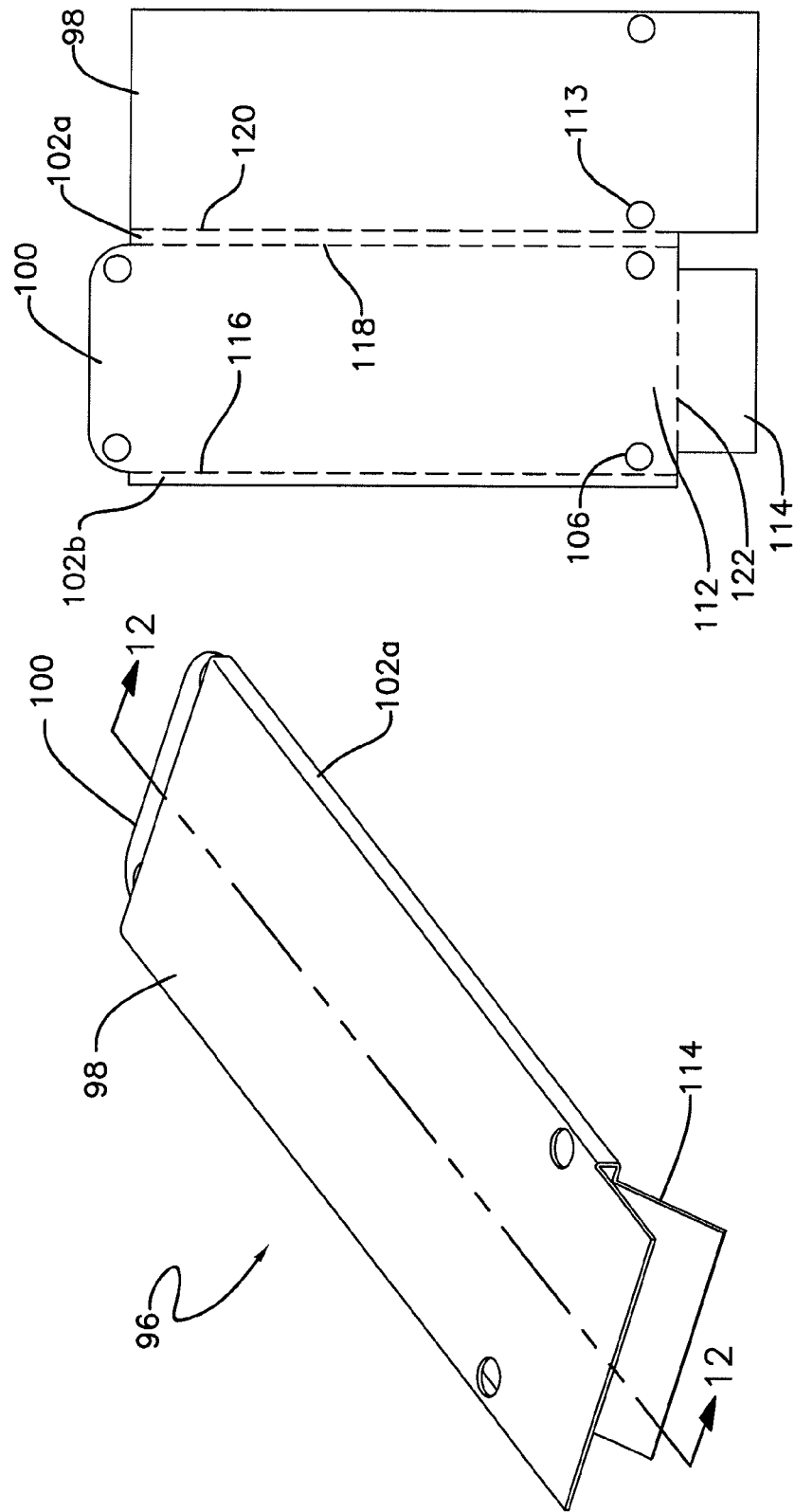

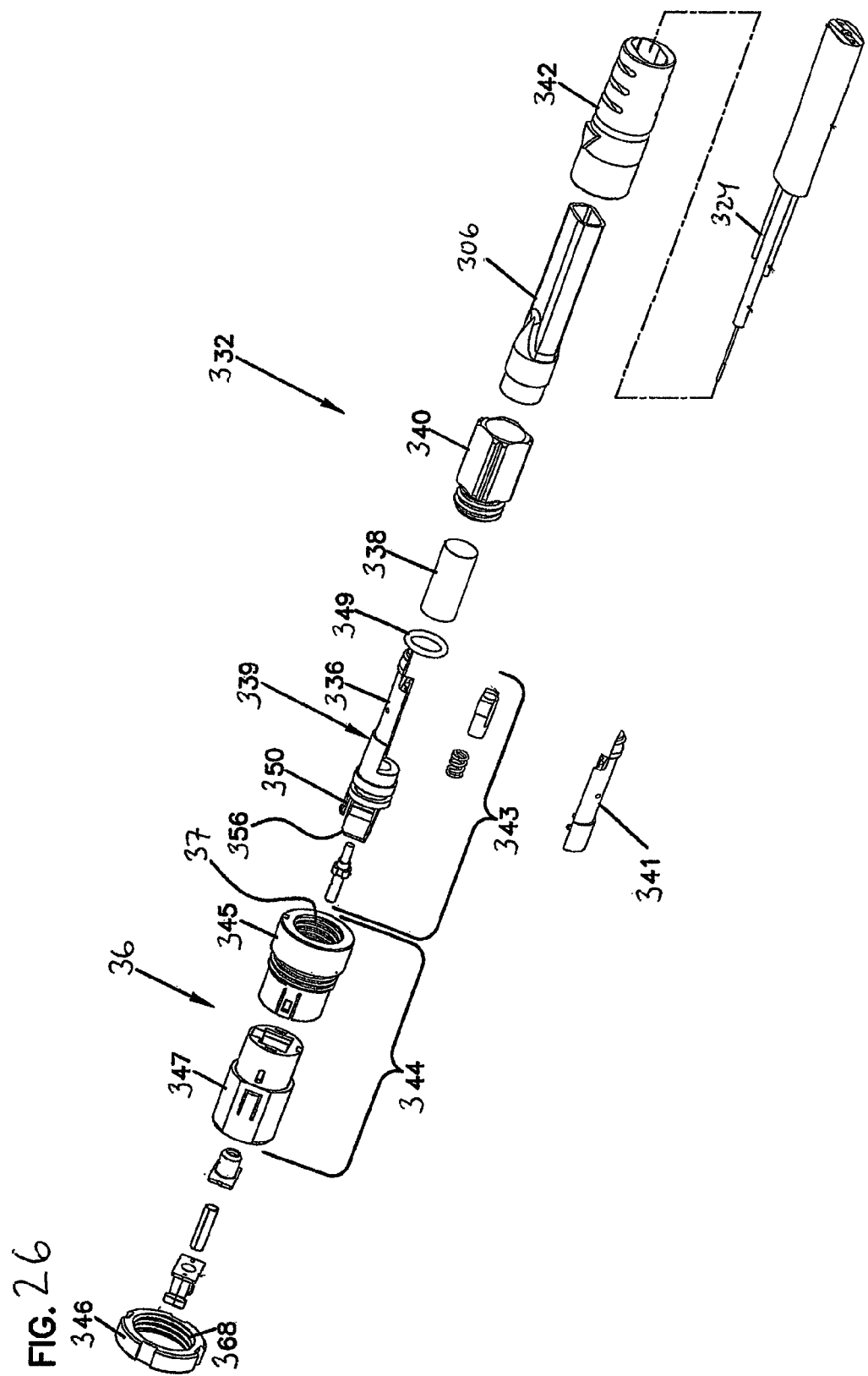

MINI DROP TERMINAL

CROSS REFERENCE TO RELATED APPLICATIONS

This application is a divisional application of U.S. patent application Ser. No. 12/248,564, entitled "Mini Drop Terminal" and filed on Oct. 9, 2008, which claims the benefit of U.S. Provisional Patent Application Ser. No. 60/978,638, filed Oct. 9, 2007, which applications are hereby incorporated by reference in their entirety.

TECHNICAL FIELD

The present disclosure relates to fiber optic cable termination systems, and more particularly, to drop terminals used in fiber optic cable telecommunication systems.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles) for receiving the fiber optic connectors desired to be interconnected. The adapter includes an internal sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described in U.S. Pat. Nos. 6,579,014, 6,648,520, and 6,899,467.

Fiber optic telecommunication technology is becoming prevalent in part because service providers want to deliver high bandwidth communication capabilities to subscribers. One such technology is referred to as passive optical networks (PONS). PONS may use optical fibers deployed between a service provider central office, or head end, and one or more end user premises. A service provider may employ a central office, or head end, containing electronic equipment for placing signals onto optical fibers running to user premises. End user premises may employ equipment for receiving optical signals from the optical fibers. In PONS, the central office, or head end, transmission equipment and/or the transmission equipment located at the end user premises may, respectively, use a laser to inject data onto a fiber in a manner that may not require the use of any active components, such as amplifiers between the central office, or head end, and/or the end user premises. In other words, only passive optical components, such as splitters, optical fibers, connectors and/or splices, may be used between a service provider and an end user premises in PONS. PONS may be attractive to service providers because passive networks may be less costly to maintain and/or operate as compared to active optical networks and/or older copper based networks, such as a public switched telephone network (PSTN). In addition to possibly being less expensive than other network topologies, PONS may provide sufficient bandwidth to meet a majority of end users' high bandwidth communication needs into the foreseeable future.

In PONS, transmission equipment may transmit signals containing voice, data and/or video over a fiber strand to the premises. An optical fiber may be split using, for example, passive optical splitters so that signals are dispersed from one fiber (the input fiber) to multiple output fibers running to, for example, user premises from a convergence point in the network. An optical fiber routed to a user's premises may be routed via a fiber drop terminal en route to the premises. At the fiber drop terminal, signals appearing on one or more optical fibers may be routed to one or more end user premises. Fiber drop terminals may be mounted in aerial applications, such as near the tops of utility poles, along multi-fiber and/or multi-conductor copper strands suspended between utility poles. Fiber drop terminals may also be installed in junction boxes mounted at ground level and/or in below-grade vaults where utilities are run below ground. Example fiber drop terminals are disclosed at U.S. Pat. No. 7,120,347; U.S. Patent Publication No. 2005/0213921 (now U.S. Pat. No. 7,292,763); and U.S. Patent Publication No. 2006/0153517 (now U.S. Pat. No. 7,680,388).

SUMMARY

An aspect of the present disclosure relates to a terminal for mounting to a fiber distribution cable. The terminal includes a housing having a base and a cover. The cover is connectedly engaged with the base. The terminal further includes a plurality of adapters disposed on the cover. A fiber routing tray having a top panel and a bottom panel is disposed in an interior cavity defined by the base and the cover. The fiber routing tray includes a storage space defined between the top and bottom panels for storing a length of optical fiber.

Another aspect of the present disclosure relates to a retention device for securing a fiber distribution cable to a terminal. The retention device includes a base piece, a body and a cover piece. The body includes a lower surface engaged with the base piece and an oppositely disposed upper surface that defines a fiber passage. The fiber passage has a recess configured to receive a splice that couples a first cable and a second cable. The cover piece includes a top surface and a bottom surface defining a passage configured to receive the first and second cables. The cover piece is adapted for snap-fit engagement with the base piece such that the body is disposed between the base piece and the cover piece.

Another aspect of the present disclosure relates to a method for installing a terminal. The method includes providing a terminal having a housing defining an interior cavity. A multi-fiber cable is pulled from the interior cavity of the housing. The multi-fiber cable is spliced to a fiber distribution cable with a multi-fiber splice. The multi-fiber cable is inserted back into the interior cavity of the housing. A spliced end of the multi-fiber cable, a spliced end of the fiber distribution cable and the multi-fiber splice are inserted in a retention device.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DESCRIPTION OF THE DRAWINGS

FIG. 1B is a front view of the terminal of FIG. 1A.

FIG. 1C is a perspective view of a front side of a cover of the terminal of FIG. 1A.

FIG. 9 is an exploded perspective view of the terminal of FIG. 1A.

FIG. 10 is a perspective view of a fiber routing tray suitable for use in the terminal of FIG. 1A having features that are examples of aspects in accordance with the principles of the present disclosure.

FIG. 11 is an expanded view of the fiber routing tray of FIG. 10.

FIG. 26 is an exploded, perspective view of a fiber optic connection system suitable for use in the terminal of FIG. 1A.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1A:
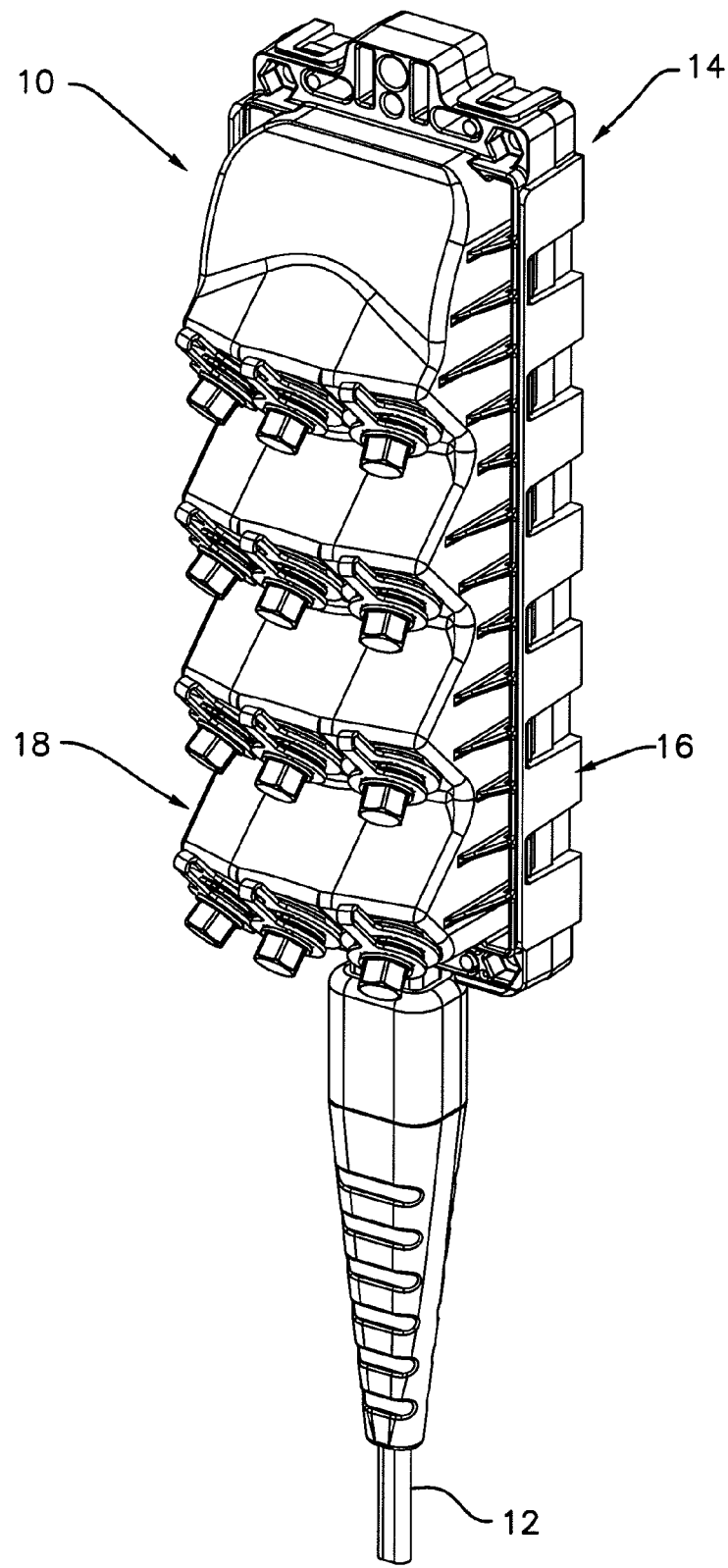
FIG. 1A is a perspective view of a terminal having features that are examples of aspects in accordance with the principles of the present disclosure.

Referring now to FIGS. 1A-1C, a terminal, generally designated 10, for mounting to a fiber distribution cable 12 is shown. The terminal 10 includes a housing, generally designated 14, having a base, generally designated 16, and a cover, generally designated 18.

Figure 2:
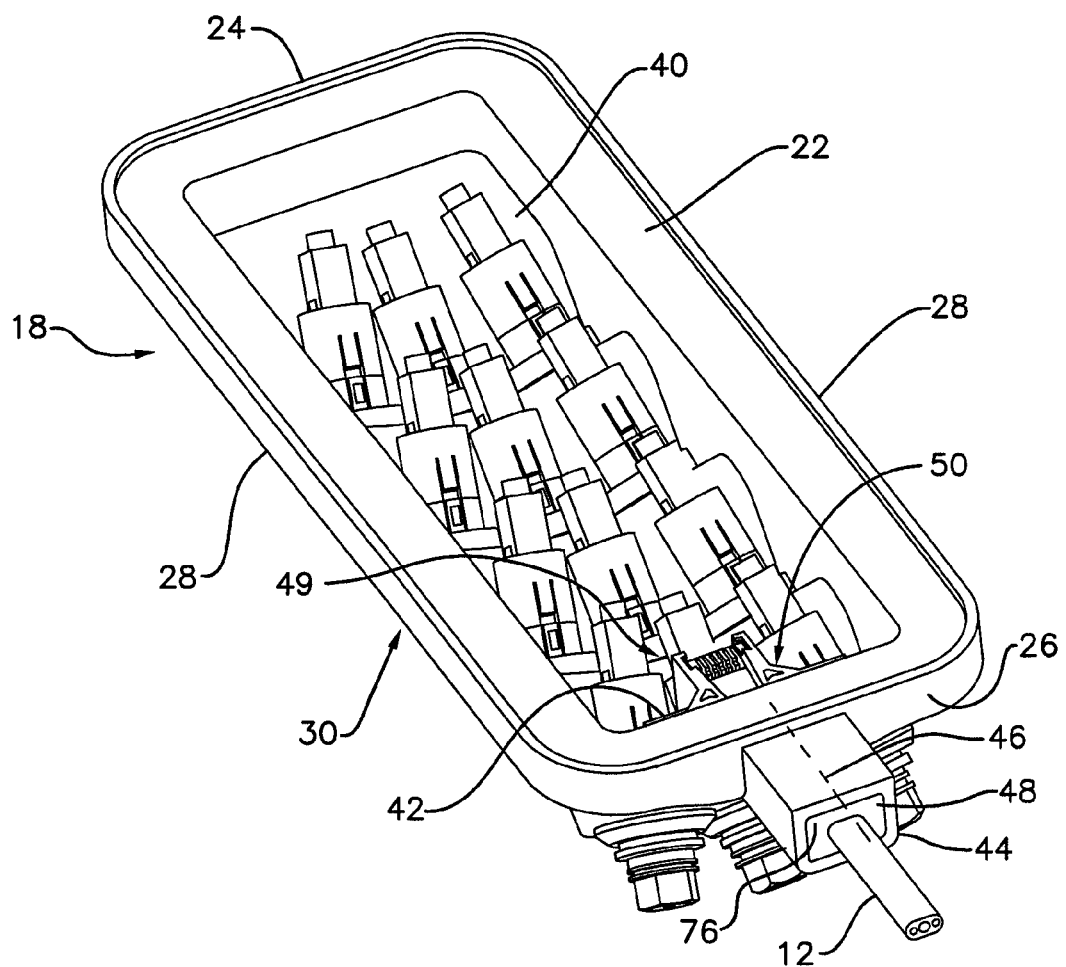
FIG. 2 is a perspective view of a rear view of the cover of FIG. 1C.
Figure 3A:
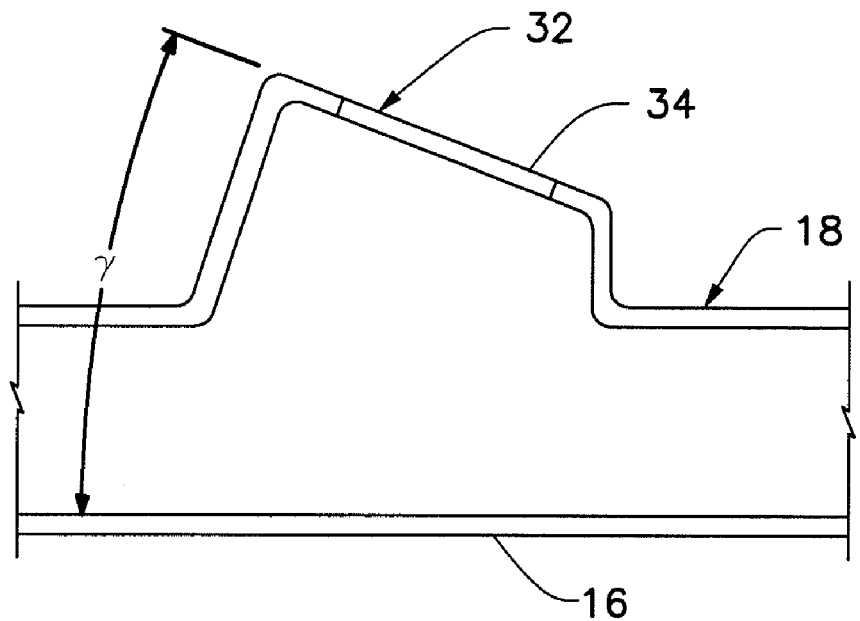
FIG. 3A is a cross-sectional view of an angled step of the cover taken on line 3A-3A of FIG. 1B.
Figure 3B:
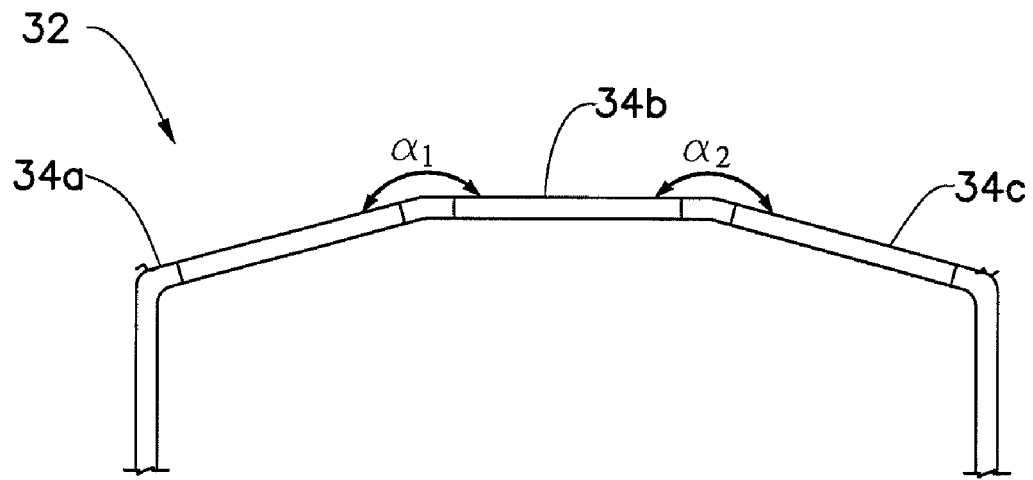
FIG. 3B is a cross-sectional view of an angled step of the cover taken on line 3B-3B of FIG. 1B.

Referring now to FIGS. 1A-2, the cover 18 includes an outer surface 20, an oppositely disposed rear surface 22, a top wall 24, an oppositely disposed bottom wall 26, and sidewalls 28. The terminal 10 defines a footprint area that is defined by an outer perimeter 30 of the cover 18. In the subject embodiment, the footprint area is defined by the top wall 24, the bottom wall 26, and the sidewalls 28. In the subject embodiment, the footprint area is generally rectangular in shape. It will be understood, however, that the scope of the present disclosure is not limited to the cover having a footprint that is generally rectangular in shape. In the subject embodiment, and by way of example only, the footprint area of the terminal 10 is less than 25 in$^2$. In another embodiment, the footprint area of the terminal 10 is less than 21 in$^2$.

The outer surface 20 of the cover 18 includes a plurality of angled steps, generally designated 32. In the subject embodiment, and by way of example only, there are four angled steps 32a, 32b, 32c, 32d. The angled steps 32 are configured on the outer surface 20 of the cover 18 in arcuate shaped rows. This arcuate row configuration efficiently utilizes space on the outer surface 20 of the cover 18 thereby allowing for a compact size of the terminal 10.

Referring now to FIGS. 1B, 1C, 3A and 3B, each angled step 32 includes a plurality of mounting surfaces 34 on which are disposed adapters 36. In the subject embodiment, and by way of example only, each angled step 32a, 32b, 32c, 32d includes three mounting surfaces 34a, 34b, 34c. Each mounting surface 34a, 34b, 34c is disposed on the angled step 32 such that each mounting surface 34a, 34b, 34c is oriented at an oblique angle γ (shown in FIG. 3A) to the base 16 and forms a mating angle α (shown in FIG. 3B) with each adjacent mounting surface 34a, 34b, 34c on the angled step 32. The mating angle α is defined as the space between adjacent mounting surfaces 34 having a common edge with the adjacent mounting surfaces 34 diverging from each other. For example, in the subject embodiment, the mounting surface 34a of the angled step 32a shares a common edge 39 (shown only in FIG. 1B) with the adjacent mounting surface 34b. The mounting surface 34a forms a mating angle $\alpha_1$ with the mounting surface 34b. In the subject embodiment, the mating angle $\alpha_1$, which is measured on the outer surface 20 of the cover 18, is an oblique angle. In the subject embodiment, and by way of example only, the mating angle $\alpha_1$ is less than about 210 degrees. In one embodiment, the mating angle $\alpha_1$ is about 190 degrees. Similarly, the mounting surface 34c forms a mating angle $\alpha_2$ with the mounting surface 34b. In the subject embodiment, the mating angle $\alpha_2$ is an oblique angle. In the subject embodiment, and by way of example only, the mating angle $\alpha_2$ is less than about 210 degrees. In one embodiment, the mating angle $\alpha_2$ is about 190 degrees. The angling of each of the mounting surfaces 34 with respect to the base 16 and to the adjacent mounting surfaces 34 further efficiently utilizes the space of the outer surface 20 of the cover 18 thereby allowing for a compact size of the terminal 10.

In the subject embodiment, the adapters 36 are oriented on each of the angled steps 32 such that one adapter 36 is disposed on each of the mounting surfaces 34 of each of the angled steps 32. The adapters 36 are oriented on the mounting surfaces 34 such that the adapters 36 are generally perpendicular to the corresponding mounting surfaces 34. The adapters 36 are oriented in an arcuate configuration on each of the angled steps 32.

Figure 4:
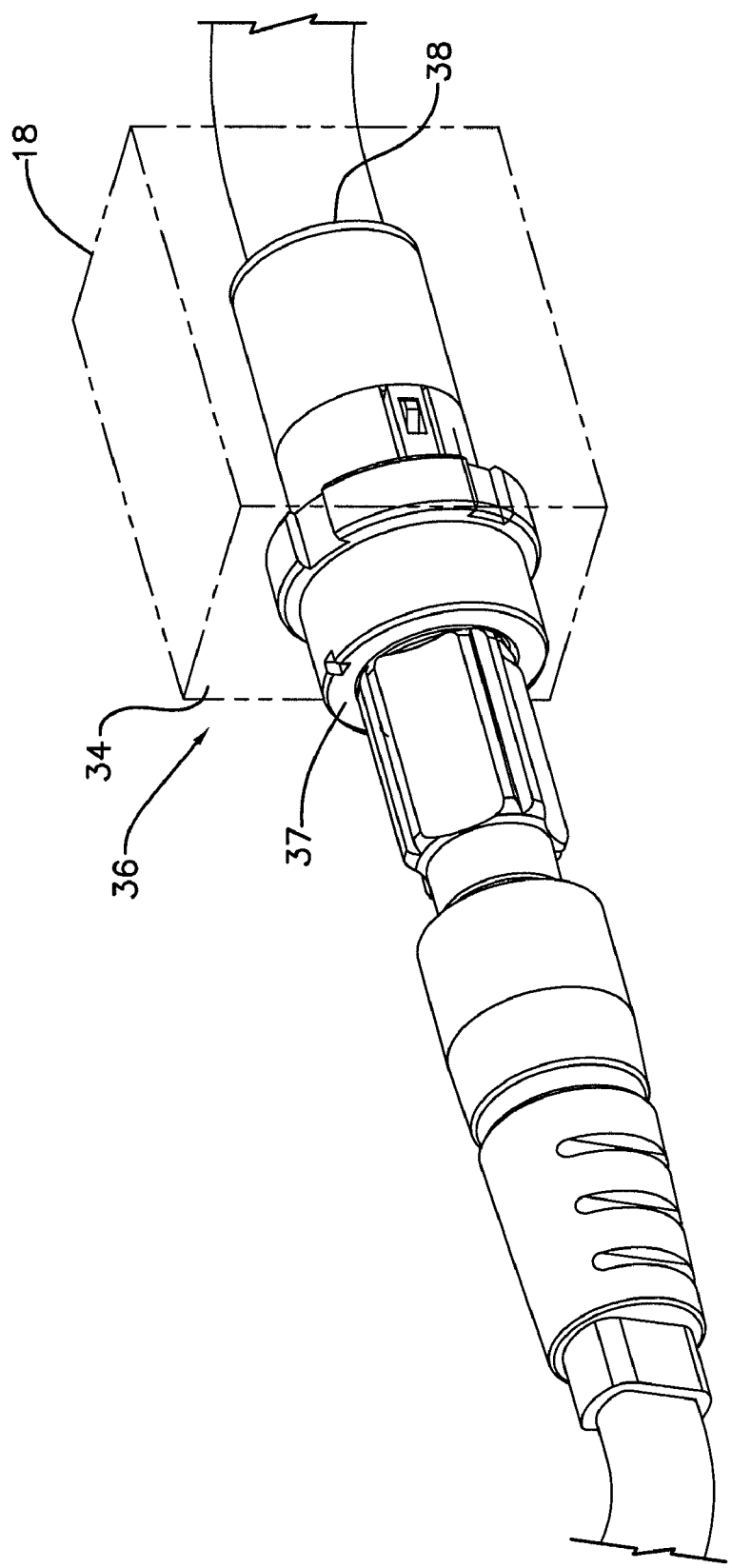
FIG. 4 is a perspective view of an adapter suitable for use in the terminal of FIG. 1A.
Figure 5:
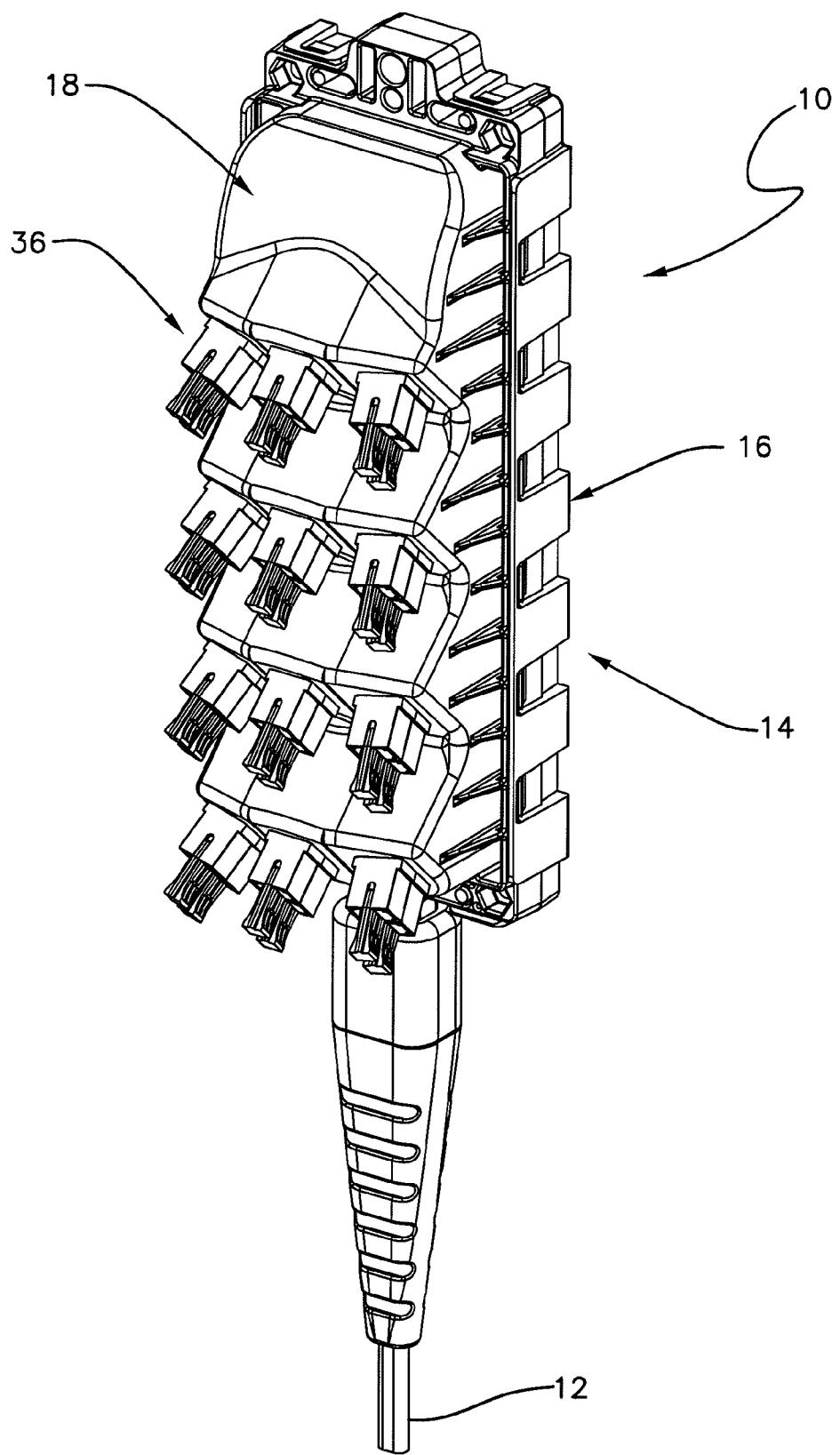
FIG. 5 is a perspective view of the terminal of FIG. 1A having an alternate embodiment of adapters.

Referring now to FIGS. 4, 5 and 26, the adapters 36 include a first port 37 for receiving a connectorized end of a first cable having a first fiber optic connector 332 and a second port 38 for receiving a connectorized end of a second cable having a second fiber optic connector. The first cable is optically coupled to the second cable when the connectorized ends of the first and second cables are positioned within their respective ports 37, 38 of the adapter 36. The adapters 36 of the subject embodiment have been described in U.S. patent application Ser. No. 11/657,404 (now U.S. Pat. No. 7,591,595), which was filed on Jan. 24, 2007 and which is hereby incorporated by reference. It will be understood, however, that the scope of the present disclosure is not limited to the adapters 36 shown as the adapters 36 can be any of a variety of adapters 36 including, but not limited to SC, angled SC, dual SC (shown only in FIG. 5), LC, dual LC, etc.

The first connector 332 and the adapter 36 are hardened or ruggedized. By hardened or ruggedized, it is meant that first connector 332 and the adapter 36 are adapted for outside environmental use. For example, the first connector 332 and the adapter 36 can include environmental seals for preventing moisture/water intrusion.

Referring to FIG. 26, the first connector 332 includes a connector housing 339 including a main body 336 and a cover 341. The connector housing 339 extends from a distal end to a proximal end (distal and proximal are defined with respect to the connection with the first fiber optic cable for connector 332). A ferrule assembly 343 mounts adjacent the distal end of the connector housing 339 and a strain relief boot 342 mounts adjacent the proximal end of the connector housing 339. A sealing member 349 (e.g., an o-ring seal) mounts around a periphery/exterior of the connector housing 339. The sealing member 349 is adapted for providing a seal between the connector housing 339 and the adapter 36 when the first connector 332 is plugged into the first port 37 of the adapter 36. The first connector 332 also includes a crimp band 338 that mounts over the main body 336 and the cover 341, and a sealing tube 306 that seals the interface between the first cable and the connector housing 339. The crimp band 338 assists in retaining the cover 341 on the main body 336 and also assists in securing strength members 324 of the first cable in place between the cover 341 and the main body 336. The first connector 332 also includes first and second fastening structures for retaining (i.e., connecting, securing, etc.) the first connector 332 within the first port 37 of the adapter 36. For example, the first connector 332 can include a latch 350 for mechanically interlocking with the adapter 36 when the first connector 332 is inserted in the first port 37. The first connector 332 also includes a coupling nut 340 adapted to thread into the adapter 36 to retain the first connector 332 within the first port 37 of the adapter 36.

The coupling nut 40 of the first connector 32 is adapted to provide a second connection mechanism for securing the first connector 32 to the adapter 34. After the latch 50 has interlocked with the adapter 34, the coupling nut 40 can be threaded into corresponding threads provided within the first port 35 so as to provide a second connection with the adapter 34. The coupling nut 40 provides a connection with the adapter 34 that has a substantially greater pull-out resistance from the pull-out resistance provided by the latch 50. In one example embodiment, the coupling nut 40 retains the first connector 32 in the first port 35 even if a pull-out force of at least 100 pounds is applied to the first connector 32.

The coupling nut 340 of the first connector 332 includes a first region and a second region. The first region includes a plurality of grooves to facilitate grasping of the first region, such as by a field technician or other user during connection or disconnection of the connector 332 with the adapter 36. The grooves are for example a plurality of longitudinally oriented grooves that enable a user to more easily rotate the coupling nut 340. Turning of the coupling nut 340 enables a connection means of the second region to engage or disengage with the adapter 36. In the illustrated embodiment shown in FIG. 26, the second region includes a connection means of exterior screw threads adapted to mate with internal threads provided within the first port 37 of the adapter 36. In another embodiment, other connection means may also be used.

The exterior of the connector housing 339 includes a circumferential groove for mounting the sealing member 349. The exterior of the housing 339 also includes circumferential shoulders, against which the crimp band 338 can abut after assembly of the connector, and a circumferential shoulder.

After the cover 341 has been connected with the body 336 and the first cable, the crimp band 338 is slid over a part of the connector housing 339 and crimped in place to hold the cover 341 securely onto the body 336. The sealing tube 306 is then slid over a portion of the crimp band 338 so as to cover the end of the first cable, the proximal end of the connector housing 339 and at least a portion of the crimp band 338. Heat is then applied to the sealing tube 306 to cause the sealing tube 306 to shrink and tightly form around the adjacent portions of the connector housing 339, the crimp band 338, and the first cable, to seal connector from foreign substances. The sealing member 349 is then mounted with the groove about the connector housing 339 to complete the installation of connector 332 onto the first cable. The boot 342 retains the coupling nut 340 on the connector housing 339.

Referring to FIGS. 4 and 26, the adapter 36 of the fiber optic connection system includes an outer housing 344 having a first housing piece 345 that interconnects with a second housing piece 347. The first housing piece 345 defines a first end of the outer housing 344 at which the first port 37 is located. The second housing piece 347 defines a second end of the outer housing 344 at which the second port 38 is located. An adapter assembly mounts within the outer housing 344. The adapter 36 also includes a mounting ring or nut 346 that mounts around the exterior of the outer housing 344.

The first housing piece 345 of the adapter 36 includes a first region separated from a second region by a shoulder. The first and second regions have generally cylindrical outer shapes and the shoulder provides a diameter reduction from the first region to the second region. The second region defines external threads located adjacent the shoulder. The external threads are sized to mate with corresponding internal threads 368 of the mounting nut 346 such that the mounting nut 346 can be threaded on the second region of the first housing piece 345. The second region also includes a pair of oppositely positioned latches for use in securing the first housing piece 345 to the second housing piece 347.

The first region defines the first port 37 of the adapter 36. Internal threads are provided within the first region adjacent the first end of the housing 344. The internal threads within the first port 37 are sized to threadingly receive the exterior screw threads of the coupling nut 340 when the coupling nut is threaded into the first port 37 to provide a secure connection between the first connector 332 and the adapter 36.

The first housing piece 345 defines an annular sealing surface positioned inside the first housing piece 345 at a location adjacent to the internal threads. An angled diameter transition decreases the internal diameter of the first port 37 from the internal threads to the annular sealing surface. The annular sealing surface is preferably generally cylindrical and is adapted to engage the sealing member 349 of the first connector 332 when the first connector 332 is fully inserted within the first port 37. The interface between the annular sealing surface and the sealing member 349 provides an internal environmental seal between the first connector 332 and the adapter 36.

The fiber optic connection system preferably has a compact configuration adapted to provide relatively high circuit densities. In one embodiment, the diameter D1 of the sealing member 349 and the diameter D2 of the annular sealing surface each are less than or equal to 15 mm. In an alternate embodiment, the diameter D1 of the sealing member 349 and the diameter D2 of the annular sealing surface each are less than or equal to 12.5 mm. In another embodiment, the diameter D1 of the sealing member 349 and the diameter D2 of the annular sealing surface each are less than or equal to 10 mm.

As the footprint area of the terminal 10 decreases, the adapter density of the terminal 10 increases. In the present disclosure, adapter density is defined as the number of adapters 36 per footprint area of the terminal 10. The adapter density can be simplified to the number of adapters per square inch. A terminal 10 having a high adapter density is desired as this provides a more efficient utilization of space than a terminal 10 having a lower adapter density. In the subject embodiment, and by way of example only, adapter density is greater than or equal to about 12 adapters per 25 in$^2$, or 0.48 adapters/in$^2$. In another embodiment, and by way of example only, the adapter density is greater than or equal to about 12 adapters per 21 in$^2$, or 0.57 adapters/in$^2$. In the embodiment shown in FIG. 5 where dual SC adapters are used, the adapter density, by way of example only, is greater than or equal to about 24 adapters per 25 in$^2$, or 0.96 adapters/in$^2$. In another embodiment where dual SC adapters are used, the adapter density, by way of example only, is greater than or equal to about 1.14 adapters/in$^2$.

Referring now to FIG. 2, the top and bottom walls 24, 26 and the sidewalls 28 define an interior cavity 40. The interior cavity 40 includes an open end 42 disposed on the rear surface 22 of the cover 18.

The bottom wall 26 of the cover 18 includes a tail piece 44 that extends outwardly from the bottom wall 26. In the subject embodiment, the tail piece 44 extends outwardly in a direction that is generally perpendicular to the bottom wall 26. The tail piece 44 defines a longitudinal axis 46 (shown as a dashed line in FIG. 2). The tail piece 44 further defines a cable opening 48 that extends through the tail piece 44 along the longitudinal axis 46 such that the cable opening 48 is in communication with the interior cavity 40.

Figure 6:
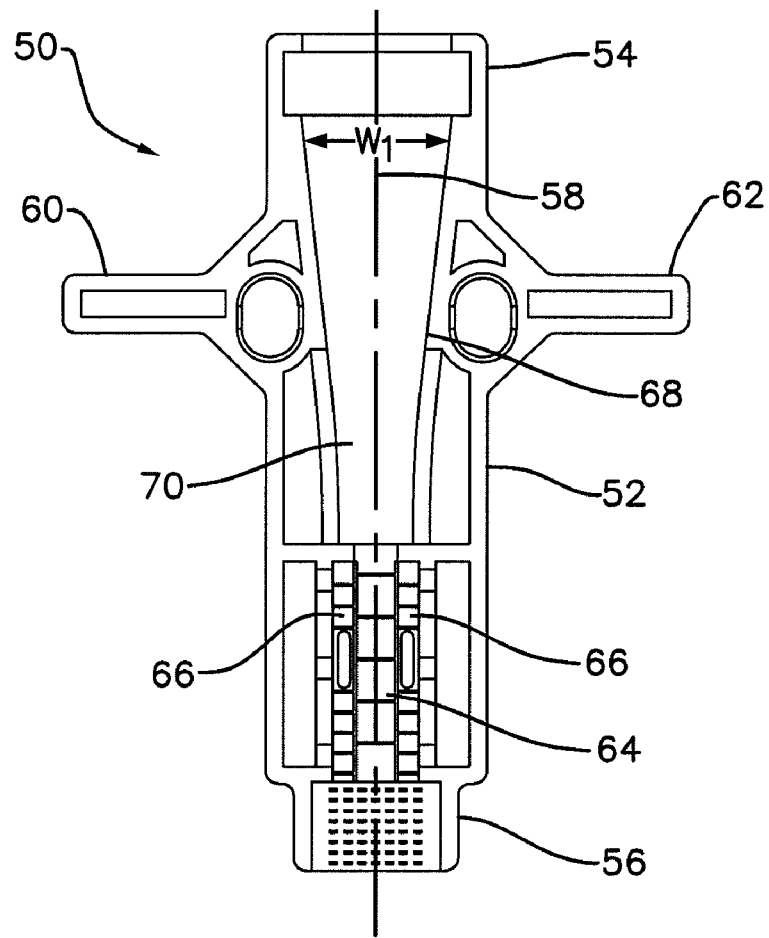
FIG. 6 is a front view of an anchor block suitable for use in the terminal of FIG. 1A having features that are examples of aspects in accordance with the principles of the present disclosure.
Figure 7:
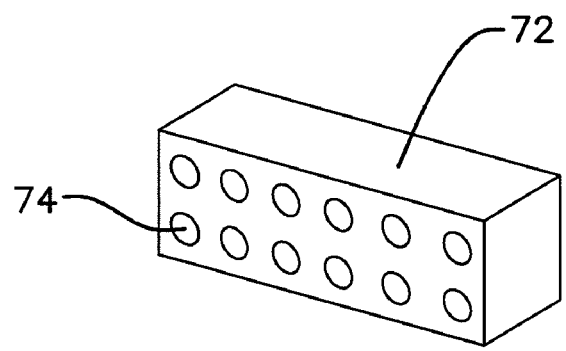
FIG. 7 is a perspective view of a divider suitable for use with the anchor block of FIG. 6.

Referring now to FIGS. 2, 6 and 7, an anchor block, generally designated 50, for use in mechanically securing the fiber distribution cable 12 to the housing 14 will be described. The anchor block 50 includes a main body 52 that extends from a first end 54 to a second end 56 of the anchor block 50. The main body 52 is elongated along a center axis 58 (shown as a dashed line in FIG. 6) of the anchor block 50. The main body 52 of the anchor block 50 is configured to mechanically interlock with the cover 18 of the terminal 10. In the subject embodiment, and by way of example only, the main body 52 includes first and second interlocking tabs 60, 62 that project outwardly from the main body 52 in opposite directions relative to the center axis 58. The first and second interlocking tabs 60, 62 are configured to be received within corresponding first and second interlock receptacles provided within the interior cavity 40 of the cover 18 adjacent to the bottom end 26. When the first and second interlocking tabs 60, 62 are inserted into the corresponding first and second interlock receptacles, interference between the first and second interlocking tabs 60, 62 and the structure forming the corresponding first and second interlock receptacles resists movement of the anchor block 50 in a direction along the center axis 58.

With the first and second interlocking tabs 60, 62 disposed in the corresponding first and second interlock receptacles, the first end 54 of the anchor block 50 is disposed in the interior cavity 40 of the cover 18 while the second end 56 of the anchor block 50 is disposed in the cable opening 48 of the tail piece 44. In one embodiment, and by way of example only, the length of the anchor block 50 disposed in the cable opening 48 of the tail piece 44 is greater than 25%. In another embodiment, and by way of example only, the length of the anchor block 50 disposed in the cable opening 48 of the tail piece 44 is greater than 50%. In another embodiment, the length of the anchor block disposed in the cable opening 48 of the tail piece 44 is in the range of 25% to 50%.

The anchor block 50 also includes structure for securing the fiber distribution cable 12 to the main body 52. In the subject embodiment, and by way of example only, the second end 56 includes a central groove 64 for receiving a central buffer tube of the fiber distribution cable 12. The second end 56 also includes two side grooves 66 that are generally parallel to the central groove 64 and positioned on opposite sides of the central groove 64. The side grooves 66 are sized to receive strength members of the fiber distribution cable 12. By placing the strength members in the side grooves 66 and the central buffer tube in the central groove 64, and then applying a securing material (e.g., adhesive such as epoxy) to the central groove 64 and the side grooves 66, the fiber distribution cable 12 is secured to the anchor block 50.

The anchor block 50 also includes a fan-out portion, generally designated 68, that fans-out/spreads-apart optical fibers of the fiber distribution cable 12 that are routed and managed within the interior cavity 40 of the cover 18. In the subject embodiment, and by way of example only, the anchor block 50 includes a fan-out channel 70 that extends from the central groove 64 to the first end 54 of the main body 52 of the anchor block 50. The fan-out channel 70 has a width $W_1$ that gradually widens as the fan-out channel 70 extends along the center axis 58 from the central groove 64 to the first end 54 of the anchor block 50.

A divider 72 (see FIG. 7) is located within the fan-out channel 70 at the first end 54 of the anchor block 50. The divider 72 includes a plurality of openings 74 that individually receive the optical fibers to maintain separation of the optical fibers. In practice, the optical fibers extend from the end of the central buffer tube through the fan-out channel 70 to the divider 72. At the divider 72, the optical fibers each extend through one of the openings 74 of the divider 72. The tapered configuration of the fan-out channel 70 allows the optical fibers to spread apart as the optical fibers extend from the end of the central buffer tube at the central groove 64 to the divider 72. A securing material (e.g., an adhesive such as epoxy) can be used to fill the fan-out channel 70 after the optical fibers have been positioned therein to maintain position of the optical fibers.

Figure 8:
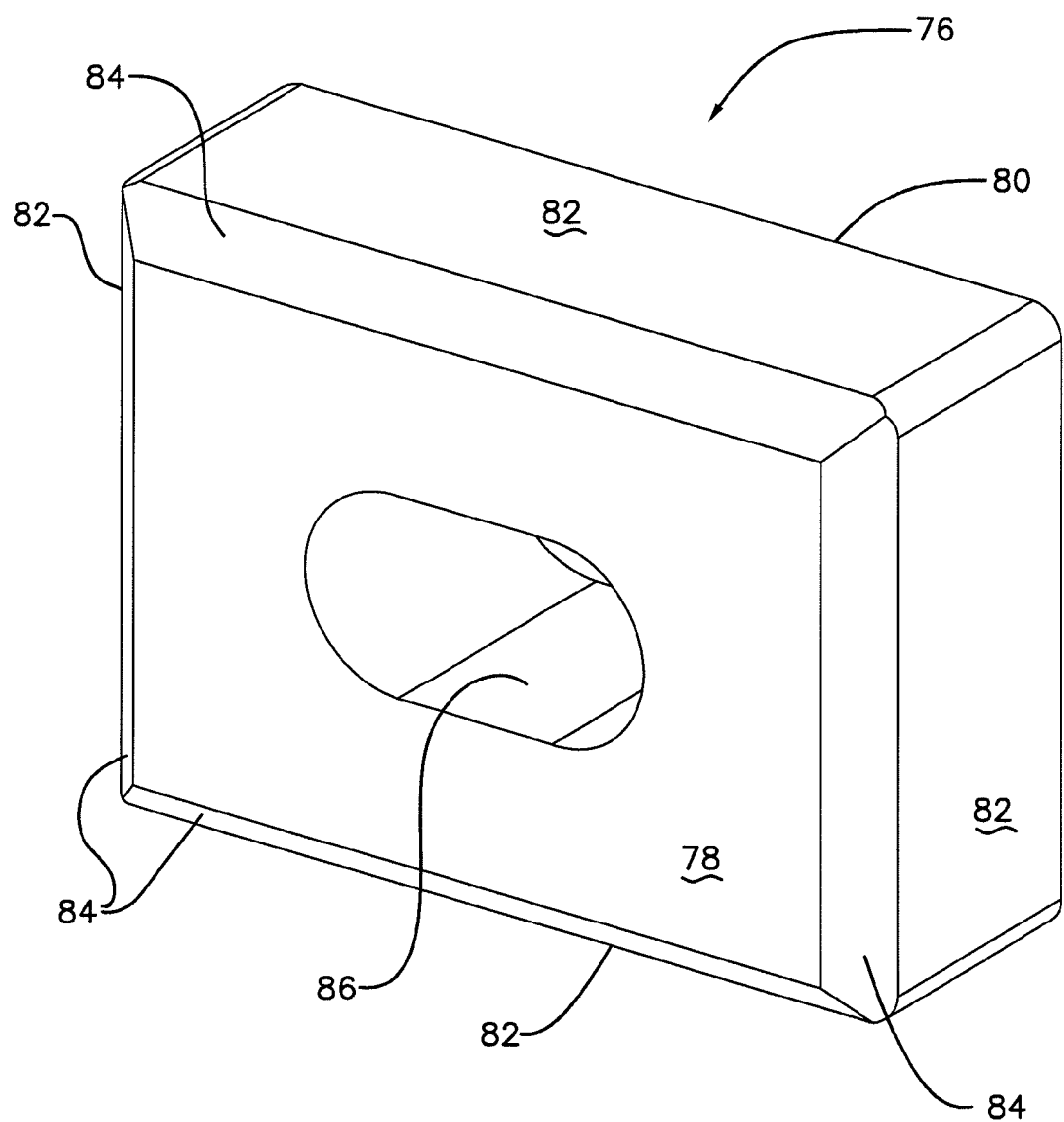
FIG. 8 is a perspective view of a cable seal suitable for use in the terminal of FIG. 1A having features that are examples of aspects in accordance with the principles of the present disclosure.
Figure 12:
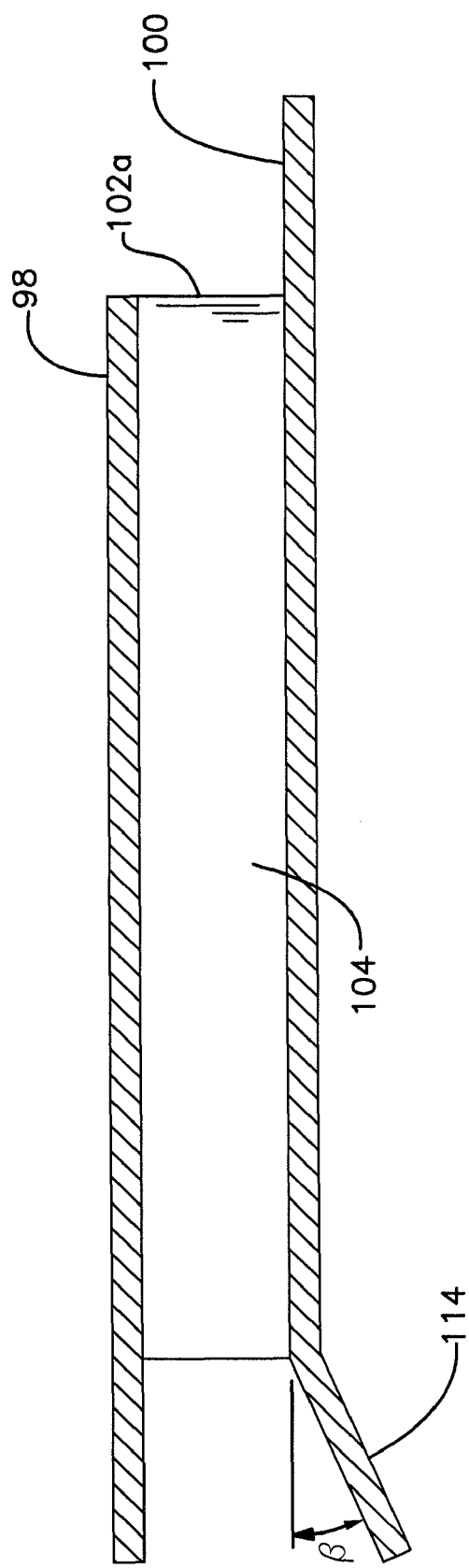
FIG. 12 is a cross-sectional view of the fiber routing tray taken on line 12-12 of FIG. 10.

Referring now to FIGS. 2 and 8, a cable seal, generally designated 76, for sealing the fiber distribution cable 12 in the tail piece 44 of the cover 18 is shown. In the subject embodiment, the cable seal 76 is made of an elastic material such as rubber. The cable seal 76 includes a first surface 78, an oppositely disposed second surface 80 and a plurality of side surfaces 82. In the subject embodiment, the cable seal 76 further includes a plurality of chamfers 84 that are located between the first surface 78 and each of the side surfaces 82.

The cable seal 76 defines a cable entry hole 86 that extends through the cable seal 76. In the subject embodiment, the cable entry hole 86 extends through the cable seal 76 in a direction that is generally perpendicular to the first surface 78. The cable entry hole 86 is sized to receive and sealing engage the fiber distribution cable 12. In the subject embodiment, the cable entry hole 86 is generally shaped as an elongated circle in order to conform to the fiber distribution cable 12. It will be understood, however, that the scope of the present disclosure is not limited to the cable entry hole 86 being shaped as an elongated circle.

The cable seal 76 is configured to be inserted into the cable opening 48 of the tail piece 44. In the subject embodiment, the cable seal 76 is inserted into the cable opening 48 such that the first surface 78 faces the interior cavity 40 of the cover. The chamfers 84, which are disposed between the first surface 78 and each of the side surfaces 82, ease the insertion of the cable seal 76 in the cable opening 48. When inserted into the cable opening 48, the side surfaces 82 of the cable seal 76 are in sealing engagement with the tail piece 44. Thus, the cable seal 76 provides sealing engagement between the cable opening 48 of the tail piece 44 and the fiber distribution cable 12.

Referring now to FIG. 9, an alternate embodiment of the terminal 10 will be described. In the subject embodiment, the terminal 10 includes the base 16 and the cover 18. The base 16 is adapted for snap-fit engagement with the cover 18 through a latch 88, which is disposed on each longitudinal side 90 of the base, having a plurality of openings 92 adapted for engagement with a plurality of protrusions 94 disposed on each of the sidewalls 28 of the cover 18. In this alternate embodiment, the terminal 10 further includes a fiber routing tray, generally designated 96.

Referring now to FIGS. 9-12, the fiber routing tray 96 includes a top panel 98, a bottom panel 100, and first and second side panels 102a, 102b disposed about the periphery of the top and bottom panels 98, 100 (directional references such as top and bottom are made with regard to FIG. 10). In the subject embodiment, the top panel 98 is disposed above the bottom panel 100 such that the top and bottom panels 98, 100 define a storage space 104 (best shown in FIG. 12) between the top and bottom panels 98, 100. The first side panel 102a is in connected engagement with both of the top and bottom panels 98, 100 while the second side panel 102b is in connected engagement with the bottom panel 100. In the subject embodiment, each of the first and second side panels 102a, 102b extend between the top and bottom panels 98, 100 in a direction that is generally perpendicular to the top and bottom panels 98, 100. It will be understood, however, that the scope of the present disclosure is not limited to the first and second side panels 102a, 102b extending between the top and bottom panels 98, 100 in a direction that is generally perpendicular.

The bottom panel 100 includes a plurality mounting holes 106. The mounting holes 106 are sized to receive mounting pins 108 (shown in FIG. 9) disposed in the interior cavity 40 of the cover 18. In the subject embodiment, and by way of example only, there are four mounting holes 106 disposed in the bottom panel 100 with two mounting holes 106 disposed at a first end portion 110 of the bottom panel 100 and two mounting holes disposed at a bottom end portion 112. The engagement of the mounting holes 106 and the mounting pins 108 provide for proper alignment and retention of the fiber routing tray 96 in the interior cavity 40 of the cover 18.

In the subject embodiment, the top panel 98 also includes a plurality of holes 113 adapted to receive the mounting pins 108 disposed in the interior cavity 40 of the cover 18. In the subject embodiment, and by way of example only, there are two holes 113 disposed on the top panel 98 so as to be in alignment with the mounting holes 106 disposed on the bottom panel 100 at the bottom end portion 112.

In the subject embodiment, the bottom panel 100 further includes a ramp portion 114 disposed at the bottom end portion 112 of the bottom panel 100. The ramp portion 114 is disposed at an angle β with respect to the bottom end portion 112 of the bottom panel 100. In the subject embodiment, and by way of example only, the ramp portion 114 is disposed at an angle that is less than or equal to 45 degrees from the bottom end portion 112 of the bottom panel 100. The ramp portion 114 provides a location for optical fibers 124 disposed in the interior cavity 40 of the cover 18 and engaged with the adapters 36 to enter the storage space 104 of the fiber routing tray 96.

In the subject embodiment, the fiber routing tray 96 is a continuous piece of material. To assembly the fiber routing tray 96, the second side panel 102b is bent at a first fold 116, which is disposed between the bottom panel 100 and the second side panel 102b, such that the second side panel 102b is generally perpendicular to the bottom panel 100. The first side panel 102a is bent at a second fold 118 disposed between the bottom panel 100 and the first side panel 102a such that the first side panel 102a is generally perpendicular to the bottom panel 100. The top panel 98 is bent at a third fold 120 disposed between the top panel 98 and the first side panel 102a such that the top panel 98 is generally perpendicular to the first side panel 102a. The ramp portion 114 is bent at a forth fold 122 disposed between the ramp portion 114 and the bottom end portion 112 of the bottom panel 100 such that the ramp portion 114 is disposed at an angle β with respect to the bottom end portion 112 of the bottom panel 100.

Figure 13:
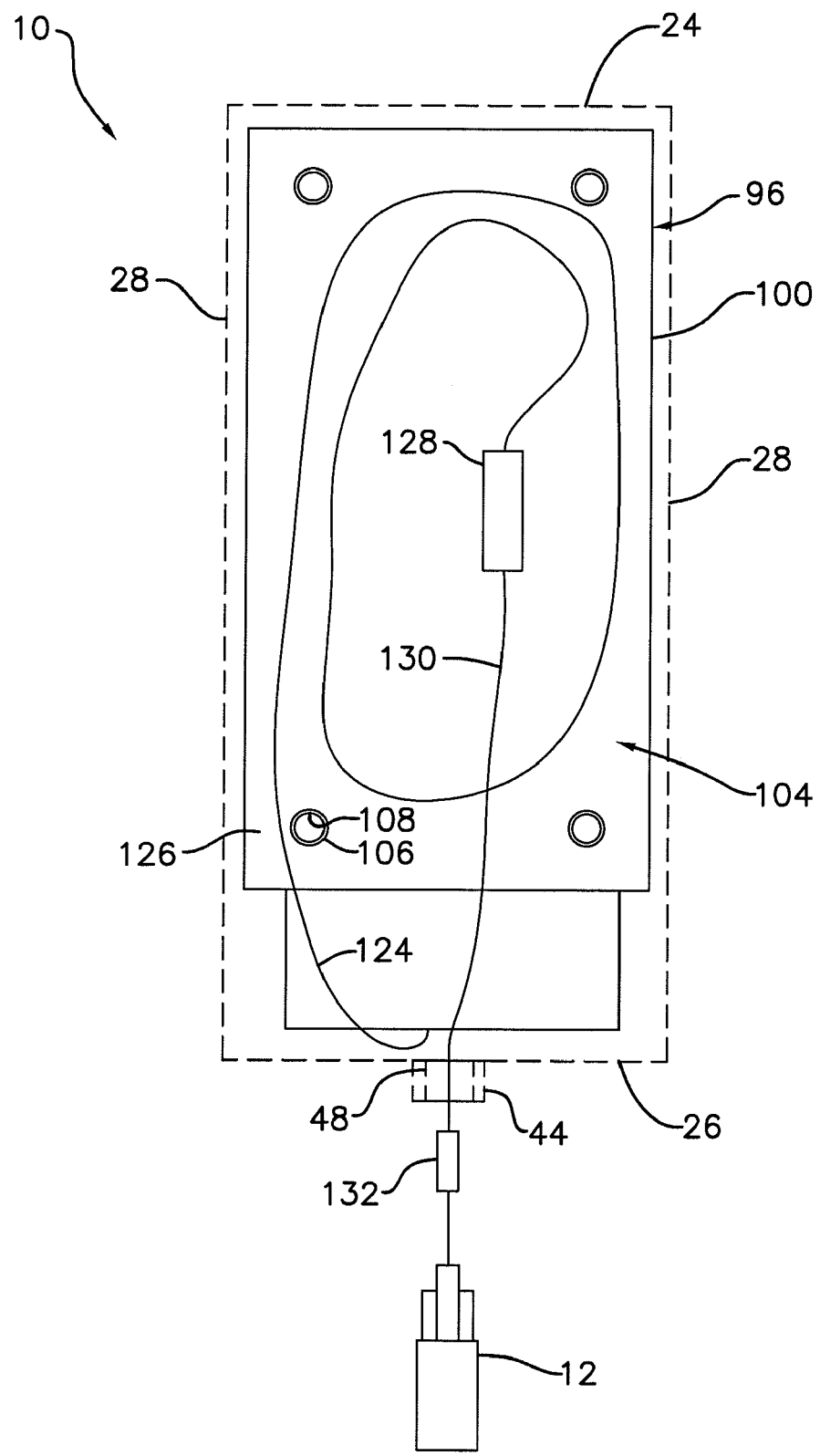
FIG. 13 is a schematic representation of a cable routing scheme for the terminal of FIG. 1A.

Referring now to FIG. 13, a cable routing schematic for the terminal 10 with the fiber routing tray 96 is shown. In the subject embodiment, optical fibers 124 that are engaged with the adapters 36 are routed into the storage space 104 of the fiber routing tray 96 through the ramp portion 114 of the bottom panel 100. In a preferred embodiment, the optical fibers 124 are bend insensitive fibers. An exemplary bend insensitive fiber is BendBright XS produced by Draka Comteq. It will be understood, however, that the scope of the present disclosure is not limited to BendBright XS fiber as various bend insensitive fibers could be used. Exemplary disclosures of bend insensitive fibers include U.S. Pat. Nos. 4,838,643 and 5,278,931, both of which are hereby incorporated by reference. In the event that bend insensitive fibers are not used, bend radius protectors may be installed to prevent attenuation of the optical fibers 124.

The optical fibers 124 are routed from the ramp portion 114 of the bottom panel 100 through a passage 126 defined between one of the mounting pins 108 and the adjacent sidewall 28 (shown as a dashed line in FIG. 13) of the cover 18. The optical fibers 124 are then loosely coiled in the storage space 104 such that the coils of optical fibers 124 are interiorly disposed with respect to the mounting pins 108.

The optical fibers 124 are in connected engagement with a fan-out device 128 that combines the individual optical fibers 124 into a multi-fiber optic cable 130. The multi-fiber optic cable 130 then exits the storage space 104 of the fiber routing tray 96 and the interior cavity 40 of the cover 18 through the cable opening 48 of the tail piece 44.

In the subject embodiment, a multi-fiber splice 132 connects the multi-fiber optic cable 130 to the fiber distribution cable 12. In order to assist in splicing the multi-fiber optic cable 130 to the fiber distribution cable 12, the multi-fiber optic cable 130 can be pulled from the storage space 104 of the fiber routing tray 96 through the cable opening 48 of the tail piece 44 of the cover 18. The loosely coiled arrangement of optical fibers 124 in the storage space 104 of the fiber routing tray 96 allows for the multi-fiber optic cable 130 to be pulled from the storage space 104 without having to disassemble the housing 14. This is advantageous as it does not disrupt or create any potential disruption of the connections between the pre-assembled optical fibers 124 and the adapters 36. While the multi-fiber optic cable 130 can be pulled from the terminal 10, the multi-fiber optic cable 130 is protected from being pulled too far out of the tail piece 44 by the routing of the optical fibers 124 through the passage 126, which is disposed between one of the mounting pins 108 and the adjacent sidewall 28 of the cover 18. In the event that the multi-fiber optic cable 130 is pulled beyond a given length stored in the storage space 104 of the fiber routing tray 96, the optical fibers 124 will rap around the mounting pin 108 thereby providing resistance which will notify the installer that the storage limit has been reached.

Figure 14:
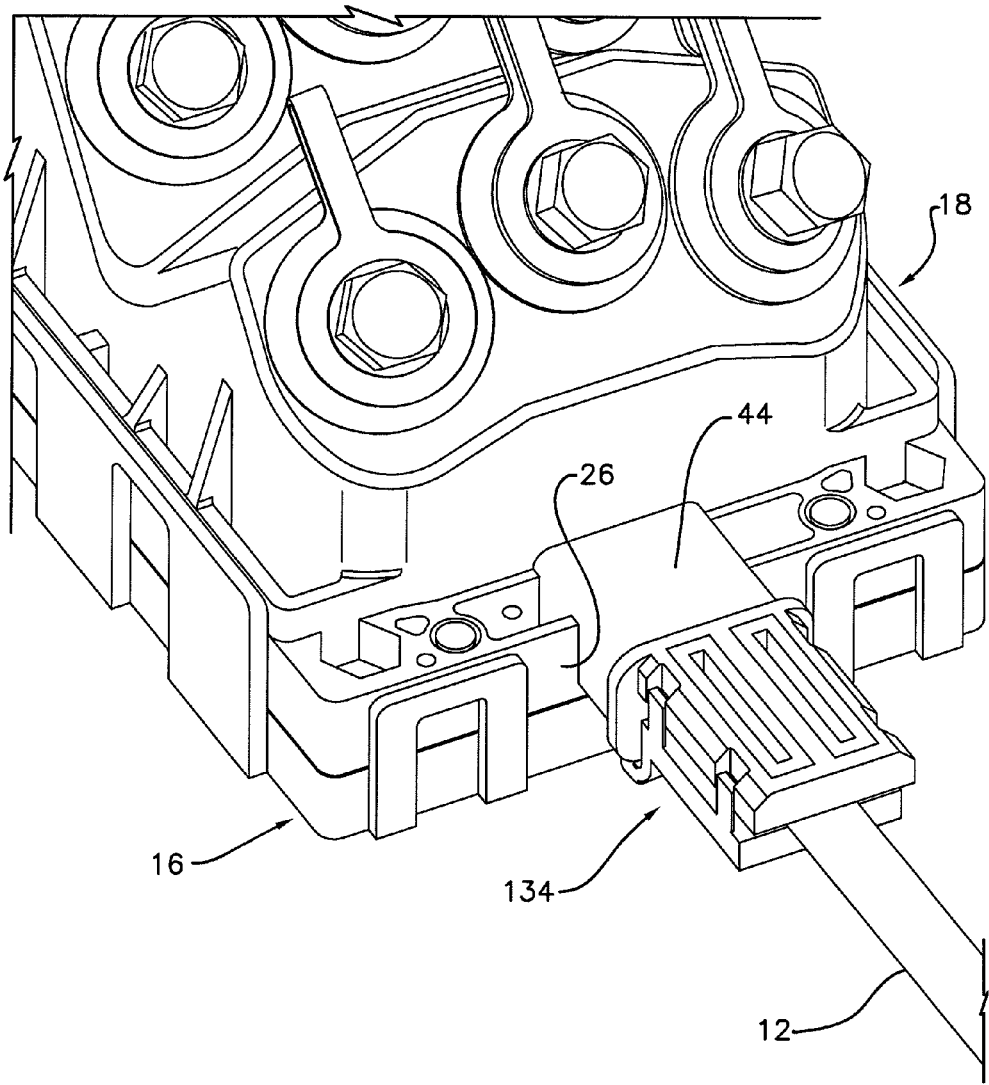
FIG. 14 is a fragmentary, perspective view of a retention device suitable for use in the terminal of FIG. 1A having features that are examples of aspects in accordance with the principles of the present disclosure.

Referring now to FIG. 14, a retention device, generally designated 134, for securing the fiber distribution cable 12 to the terminal 10 after splicing the fiber distribution cable 12 to the multi-fiber optic cable 130 will be described. The retention device 134 is connectedly engaged with the tailpiece 44 of the cover 18 of the housing 14 such that the retention device 134 extends outwardly from the tail piece 44. In the subject embodiment, the retention device 134 extends outwardly from the tail piece 44 in a direction that is generally perpendicular to the bottom wall 26 of the cover 18.

Figure 15:
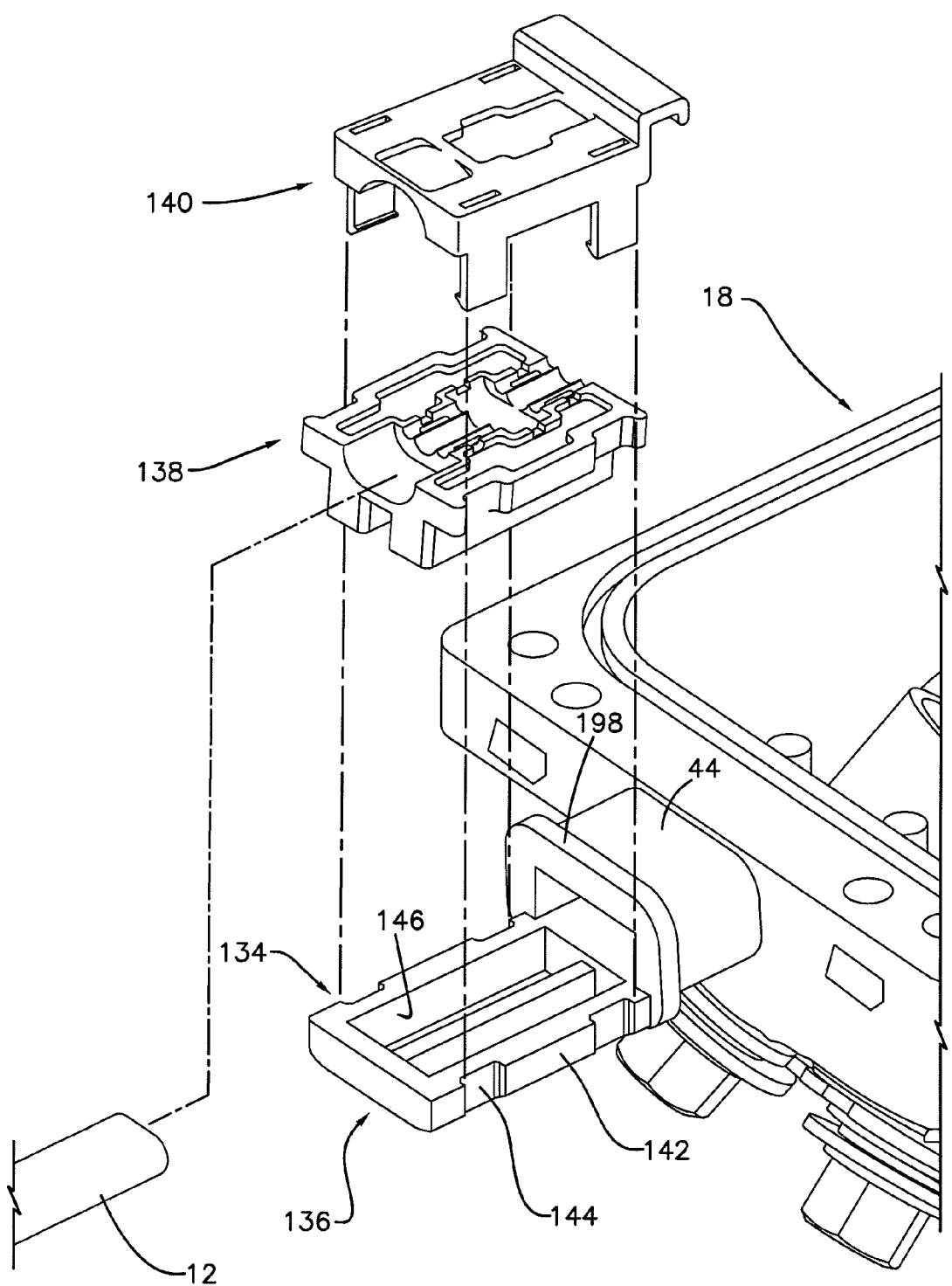
FIG. 15 is an exploded, fragmentary, perspective view of the retention device of FIG. 14.

Referring now to FIG. 15, the retention device 134 includes a base piece, generally designated 136, a body, generally designated 138, and a cover piece, generally designated 140. In the subject embodiment, the base piece 136 is an integral part of the tail piece 44 of the cover 18. It will be understood, however, that the scope of the present disclosure is not limited to the base piece 136 being integral with the tail piece 44. The base piece 136 includes longitudinal sidewalls 142 with each longitudinal sidewall 142 having a catch 144. The base piece 136 defines longitudinal slots 146. In the subject embodiment, and by way of example only, there are two longitudinal slots 146. The longitudinal slots 146 are oriented in the base piece 136 so as to be generally parallel to the center axis 58 of the tail piece 44. It will be understood, however, that the scope of the present disclosure is not limited to the longitudinal slots 146 being generally parallel to the center axis 58 of the tail piece 44.

Figure 16:
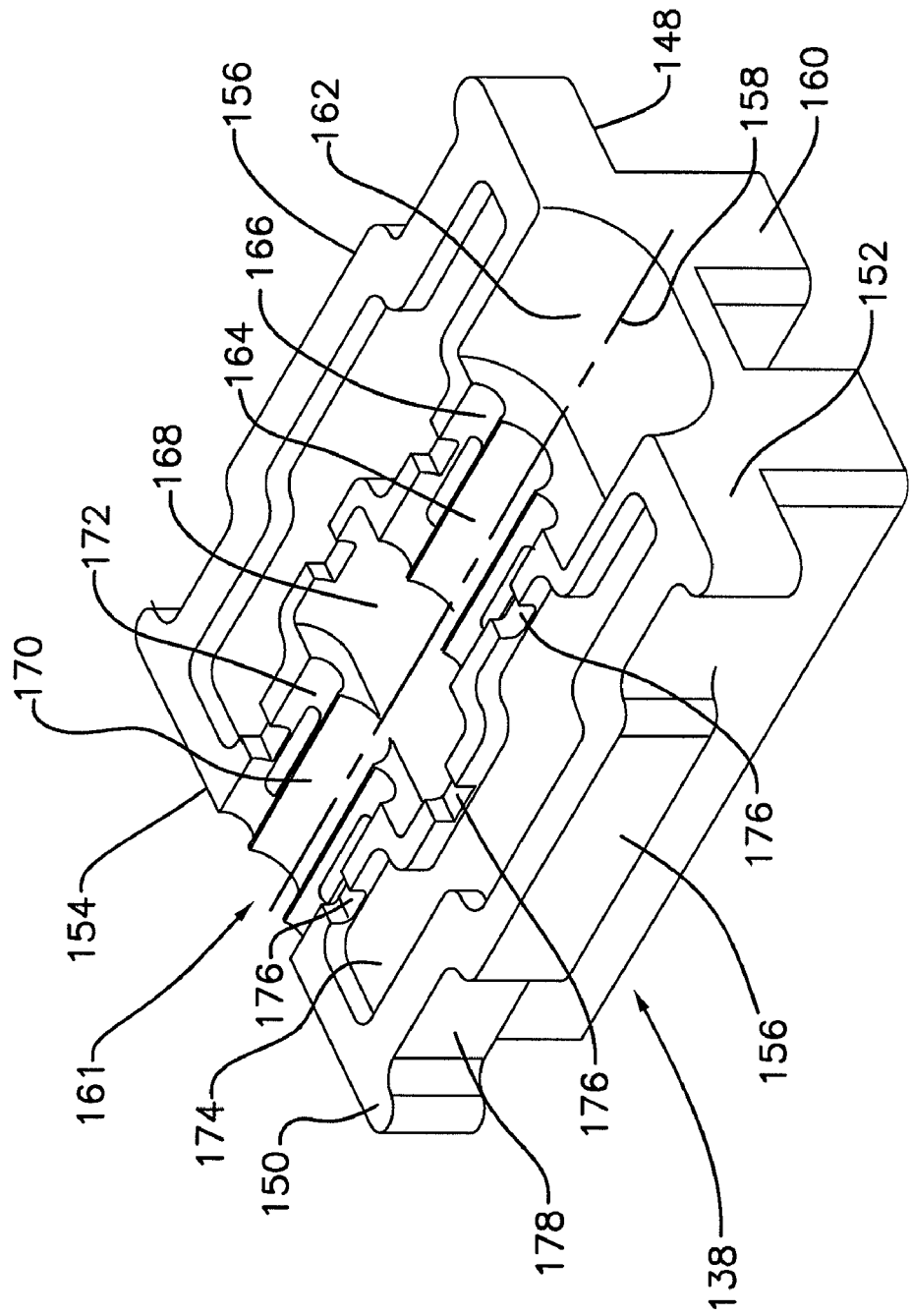
FIG. 16 is a perspective view of a body of the retention device of FIG. 14.

Referring now to FIG. 16, the body 138 of the retention device 134 will be described. The body 138 includes a lower surface 148, an oppositely disposed upper surface 150, a front side 152, a back side 154, and longitudinal sides 156 (directional references such as upper, lower, front and back are relative to FIG. 16). The body 138 further includes a central axis 158 that is centrally disposed in the body 138.

The lower surface 148 includes longitudinal protrusions 160 that extend downwardly from the lower surface 148 in a direction that is generally perpendicular to the lower surface 148. The longitudinal protrusions 152 are configured to be received in the longitudinal slots 146 of the base piece 136 in order to aid in the retention of the body 138 in the base piece 136.

The upper surface 150 defines a fiber passage, generally designated 161. The fiber passage 161 includes a cable jacket cavity 162 disposed near the front side 152 of the body 138. The cable jacket cavity 162 is adapted to receive the cable jacket of the fiber distribution cable 12. In one embodiment, the cable jacket cavity 162 includes a plurality of grasping protrusions that extend outwardly from the cable jacket cavity 162. The grasping protrusions aid in the retention of the fiber distribution cable 12 in the retention device 134.

The fiber passage 161 further includes a first center groove 164 disposed adjacent to the cable jacket cavity 162. In the subject embodiment, the first center groove 164 is aligned with the central axis 158 of the body 138. In the subject embodiment, the first center groove 164 is adapted to receive a buffer tube of the fiber distribution cable 12. Disposed on either side of the first center groove 164 are side grooves 166. In the subject embodiment, the side grooves 166 are generally parallel to the first center groove 164. The side grooves 166 are adapted to receive strength members of the fiber distribution cable 12.

The fiber passage 161 defined by the upper surface 150 of the body 138 further includes a recess 168 disposed adjacent to the first center groove 164 and the side grooves 166. The recess 168 is the dividing line between the fiber distribution cable 12 and the multi-fiber optic cable 130. The recess 168 is adapted to receive the multi-fiber splice 132 that optically couples the optical fibers of the fiber distribution cable 12 and the multi-fiber optic cable 130 and a crimp that couples and retains the strength members of the fiber distribution cable 12 to strength members in the multi-fiber optic cable 130.

The fiber passage 161 also includes a second center groove 170 that extends from the recess 168 through the back side 154 of the body 138. In the subject embodiment, the second center groove 170 is aligned with the central axis 158 of the body 138. In the subject embodiment, the second center groove 170 is adapted to receive a buffer tube of the multi-fiber optic cable 130. Disposed on either side of the second center groove 170 are grooves 172. In the subject embodiment, the grooves 172 are generally parallel to the second center groove 170. The grooves 172 are adapted to receive strength members of the multi-fiber optic cable 130.

In the subject embodiment, a plurality of adhesive recesses 174 is defined by the upper surface 150 of the body 138. In the subject embodiment, and by way of example only, there are two adhesive recesses 174 with one adhesive recess 174 disposed on each side of the fiber passage 161. The adhesive recesses 174 provide a receptacle for adhesive (such as epoxy, etc.). The adhesive can be used to secure the fiber distribution cable 12 and the multi-fiber optic cable 130 in the retention device 134. The type of adhesive used in the adhesive recesses 174 will affect the force required to remove the fiber distribution cable 12 and the multi-fiber optic cable 130 by pulling on the cables (pull-out force). Each adhesive recess 174 defines a plurality of adhesive passages 176 that provide communication between the adhesive recess 174 and the fiber passage 161. The adhesive passages 176 allow for adhesive that is poured into the adhesive recesses 174 to flow into the fiber passage 161.

In the subject embodiment, each of the longitudinal sides 156 of the body 138 defines a latch groove 178. In the subject embodiment, and by way of example only, there are two latch grooves 178 disposed on each longitudinal side 156.

Figure 17:
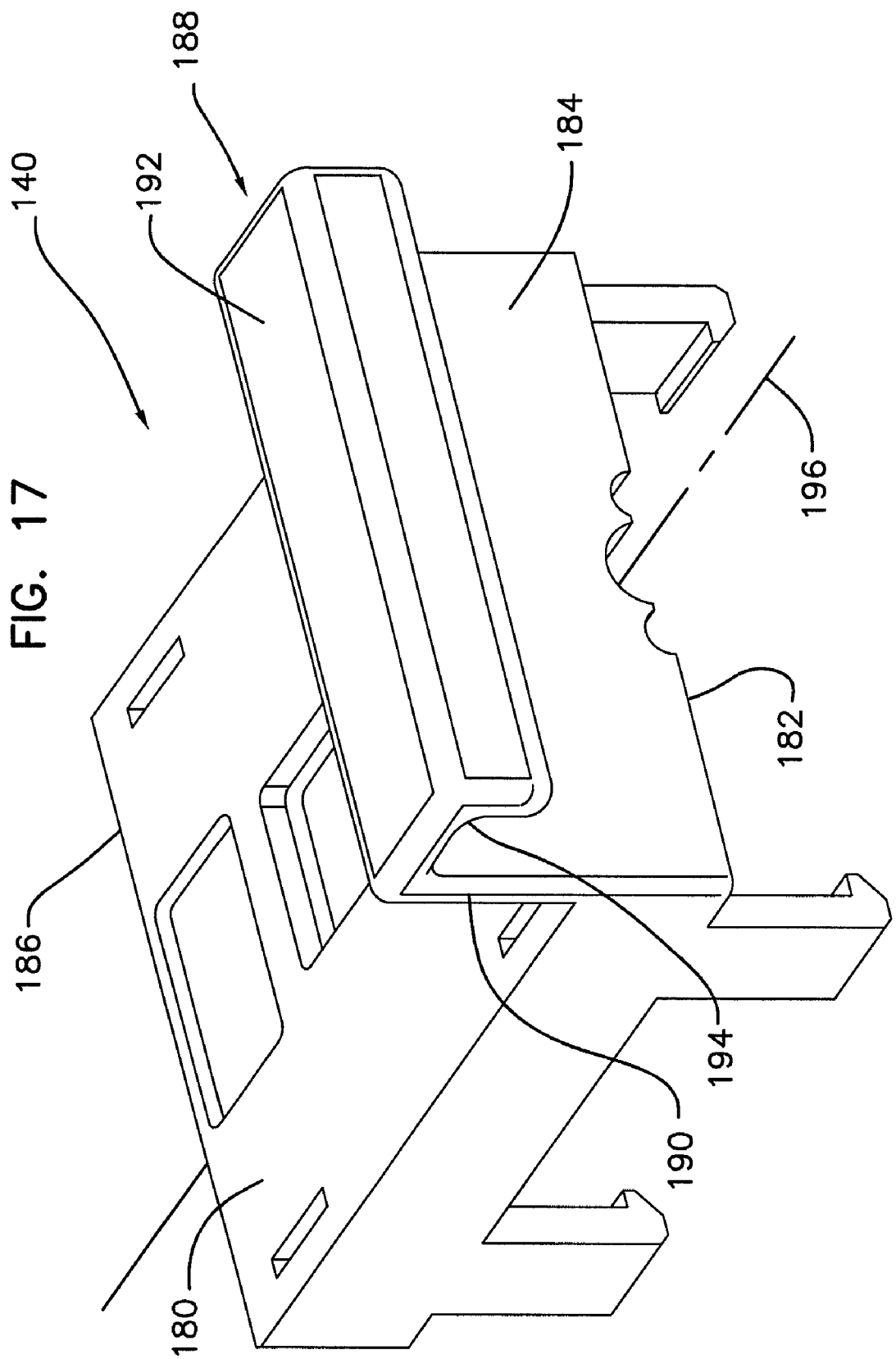
FIG. 17 is a perspective view of a cover piece for the retention device of FIG. 14.
Figure 18:
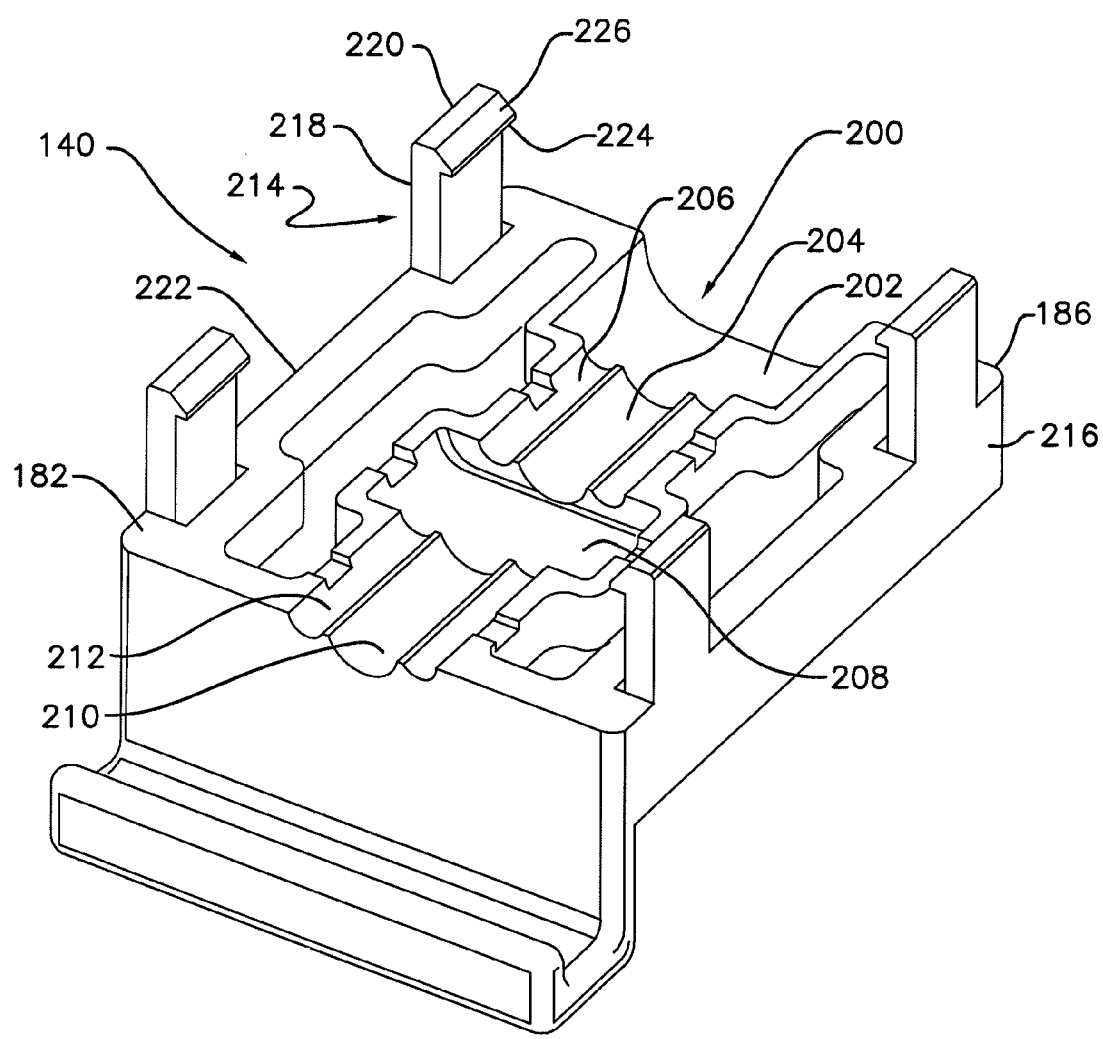
FIG. 18 is a perspective view of a fiber passage of the cover piece of FIG. 17.

Referring now to FIGS. 17 and 18, the cover piece 140 will be described. The cover piece 140 includes a top surface 180, a bottom surface 182, a tail-piece end 184, and a distribution cable end 186 (directional references such as top and bottom are relative to FIG. 14). The tail-piece end 184 includes a retention protrusion, generally designated 188, having a body portion 190 and a retention portion 192. In the subject embodiment, the body portion 190 of the retention protrusion 188 extends outwardly from the top surface 180 in a direction that is generally perpendicular to the top surface 180. It will be understood, however, that the scope of the present disclosure is not limited to the body portion 190 of the retention protrusion 188 extending outwardly in a direction that is generally perpendicular to the top surface 180.

The retention portion 192 of the retention protrusion 188 extends outwardly from the body portion 190 and defines a retention groove 194. The retention groove 194 extends along the length of the retention portion 192 such that the retention groove 194 is generally transverse to a central longitudinal axis 196 defined by the cover piece 140. In the subject embodiment, the retention protrusion 188 is hook-shaped. This configuration allows the retention protrusion 188 to receive a lip 198 (shown on FIG. 15) disposed around the tail piece 44 of the cover 18 for laterally retaining the retention device 134 to the cover 18.

The bottom surface 182 of the cover piece 140 defines a cable passage, generally designated 200. The cable passage 200 includes a jacket cavity 202, a first cable recess 204 disposed adjacent to the jacket cavity 202 and aligned generally with the central longitudinal axis 196, a strength groove 206 disposed on either side of the first cable recess 204 and disposed generally parallel to the central longitudinal axis 196, a crimp recess 208 disposed adjacent to the first cable recess 204, a second cable recess 210 that extends from the crimp recess 208 through the back side 186 of the cover piece and is generally aligned with the central longitudinal axis 196, and a strength member groove 212 disposed on either side of the second cable recess 210.

The cavities and recesses defined on the bottom surface 182 of the cover piece 140 are oriented on the bottom surface 182 so that the cavities and recesses are aligned with the cavities and recesses defined on the upper surface 150 of the body 138 when the body 138 and the cover 140 are engaged.

The cover 140 further includes a plurality of resilient latches, generally designated 214. In the subject embodiment, and by way of example only, there are four resilient latches 214 with two resilient latches 214 disposed on each side 216 of the cover piece 140. Each of the resilient latches 214 includes a base end 218 and an oppositely disposed free end 220. The base end 218 is in connected engagement with the side 216. The free end 220 of the resilient latch 214 extends outwardly from the side 216 in a direction that is generally perpendicular to an outer edge 222 of the side 216. In the subject embodiment, the base end 218 of the resilient latch 214 is integral with the side 216. The free end 220 includes a lip protrusion 224 and a sloped surface 226.

Referring now to FIG. 15-18, the body 138 of the retention device 134 is inserted into the base piece 136 such that the longitudinal slots 146 receive the longitudinal protrusions 160. With the body 138 engaged with the base piece 136, the multi-fiber splice 132, which connects the fiber distribution cable 12 and the multi-fiber optic cable 130, is inserted into the recess 168 of the body 138 of the retention device 134. The multi-fiber splice 132 is inserted into the recess 168 such that the cable jacket, the buffer tube, and strength members of the fiber distribution cable 12 are inserted into the cable jacket cavity 162, the first center groove 164 and the side grooves 166, respectively, and the buffer tube and the strength members of the multi-fiber optic cable 130 are inserted into the second center groove 164 and the grooves 172, respectively. With the multi-fiber splice 132 properly inserted into the body 138, the cover piece 140 is engaged with the base piece 136 such that the fiber distribution cable 12 and the multi-fiber optic cable 130 are disposed in the fiber passage 200 of the bottom surface 182 of the cover piece 140. The cover piece 140 is then pressed toward the base piece 136 such that the resilient latches 214 of the cover piece 140 engage the catches 144 of the base piece 136. Epoxy can be added to the body 138 and/or the cover piece 140 prior to the engagement of the cover piece with the base piece 136 in order to secure the fiber distribution cable 12 in the retention device 134.

Figure 19:
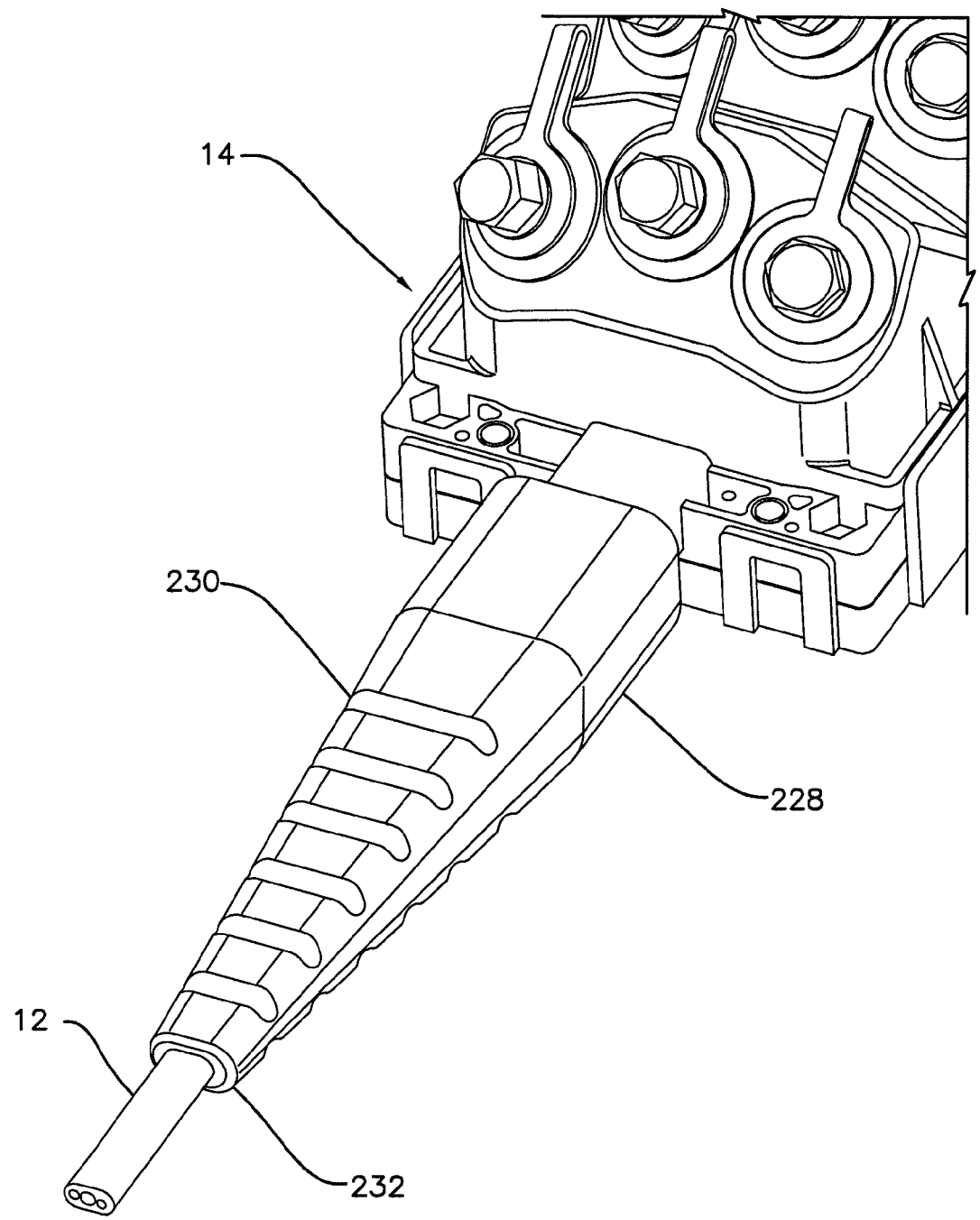
FIG. 19 is a fragmentary, perspective view of a boot suitable for use with the terminal of FIG. 1A.

Referring now to FIG. 19, a boot 228 is molded over the retention device 134 and the tail piece 44 of the cover 18 following the installation of the fiber distribution cable 12 and the multi-fiber optic cable 130 in the retention device 134. In the subject embodiment, the boot 228 includes a plurality of strain relief grooves 230 disposed near a cable end 232 of the boot 228.

Figure 20:
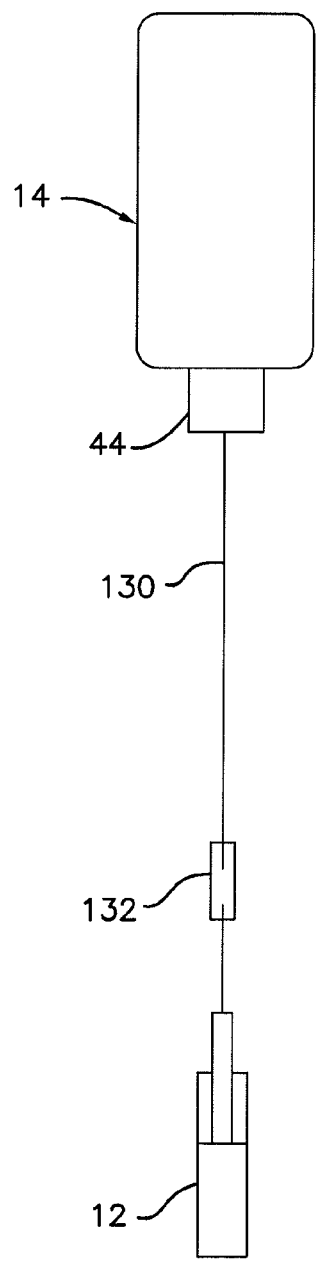
FIG. 20 is a schematic representation of an installation scheme for the terminal of FIG. 1A.
Figure 21:
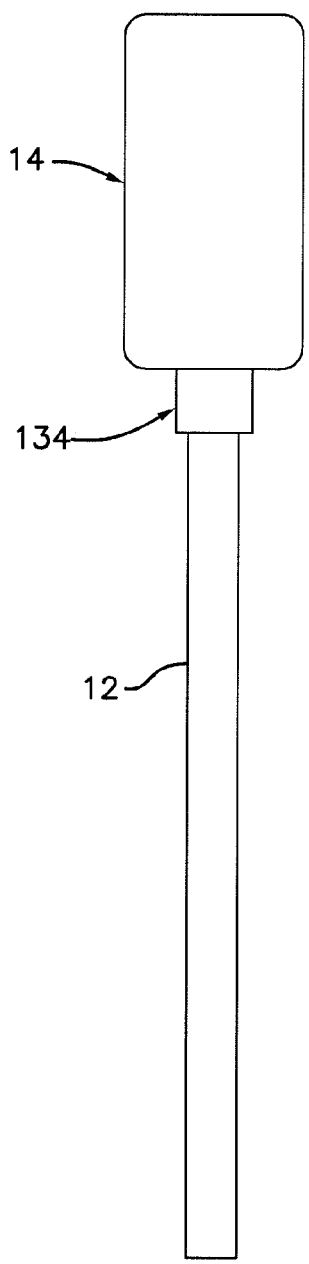
FIG. 21 is a schematic representation of an installation scheme for the terminal of FIG. 1A.

Referring now to FIGS. 20-21, a method for installing the terminal 10 will be described. The multi-fiber optic cable 130 is pulled from the interior cavity 40 through the tail end 44 of the housing 14. In the subject embodiment, the multi-fiber optic cable 130 is then spliced to the fiber distribution cable 12 with a multi-fiber splice 132.

With the multi-fiber optic cable 130 spliced to the fiber distribution cable 12, the multi-fiber optic cable 130 is inserted back into the interior cavity 40 of the housing 14 through the tail end 44 of the cover 18. A spliced end of the multi-fiber optic cable 130, the multi-fiber splice 132, and a spliced end of the fiber distribution cable 12 are then inserted into the body 138 of the retention device 134. In one embodiment, epoxy is installed in the adhesive recesses 174 of the body 138 to secure the fiber distribution cable 12 in the retention device 134. The cover piece 140 is then inserted over the body 138 of the retention device 134 such that the resilient latches 214 of the cover piece 140 engage the catches 144 of the base piece 136.

Figure 22:
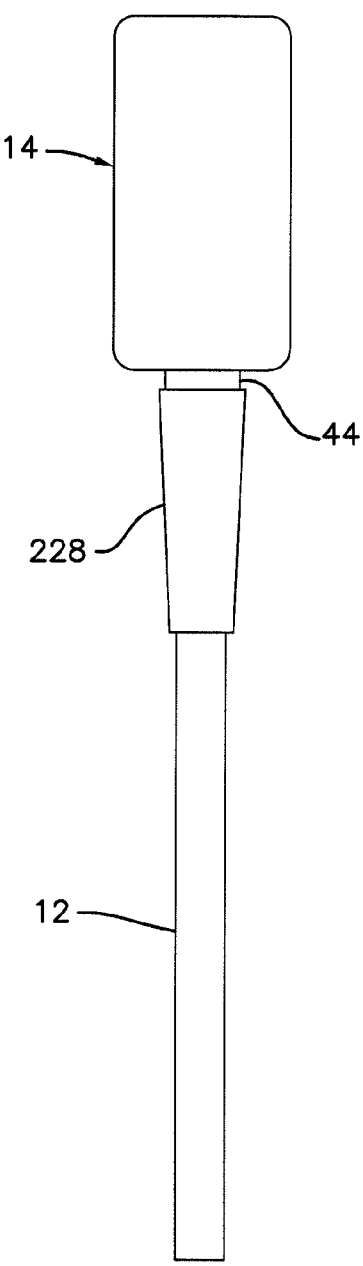
FIG. 22 is a schematic representation of an installation scheme for the terminal of FIG. 1A.

Referring now to FIG. 22, with the retention device 134 securing the fiber distribution cable 12 to the housing 14, the boot 228 is molded over the retention device 134 to prevent dust, rain, snow, or ice from entering the terminal 10. The boot 228 is molded over a portion of the tail end 44 of the cover 18, the retention device 134 and an end portion of the fiber distribution cable 12.

Figure 23:
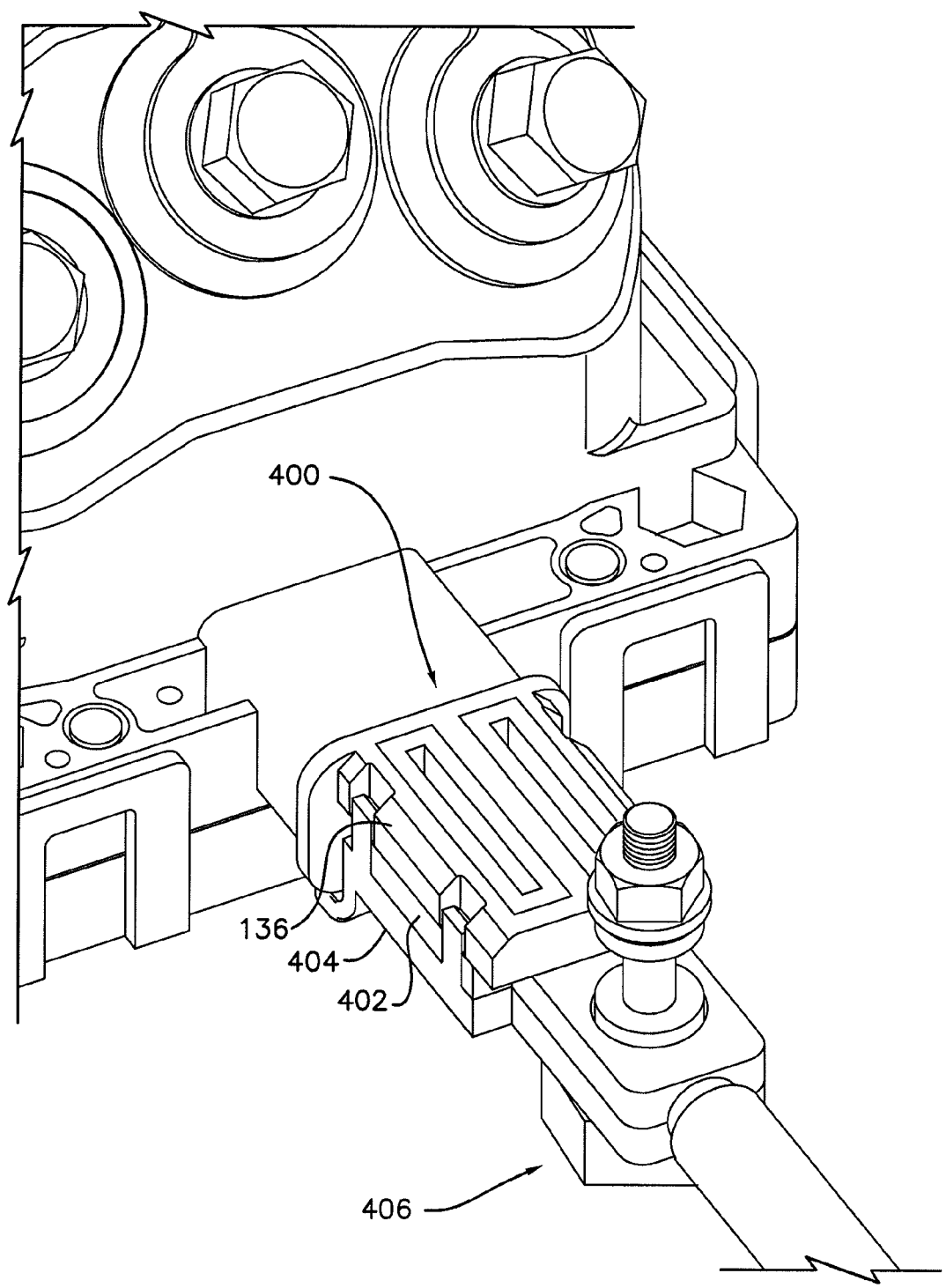
FIG. 23 is a perspective view of an alternate embodiment of a retention device suitable for use with the terminal of FIG. 1A having features that are examples of aspects in accordance with the principles of the present disclosure.

Referring now to FIG. 23, an alternate embodiment of a retention device 400 is shown. The retention device 400 includes the base piece 136, a body 402, and a cover piece 404. In the subject embodiment, the body 402 and the cover piece 404 are similar to the body 138 and the cover piece 140 described with regard to the retention device 134. However, in the alternate embodiment of the retention device 400, each of the body 402 and the cover piece 404 include a grounding opening 405 (shown in FIG. 24) that is adapted to receive a grounding lug assembly, generally designated 406. The grounding opening 405 is defined near fiber distribution cable ends 407 (shown in FIG. 24) of the body 402 and the cover piece 404. In the subject embodiment, the grounding opening 405 extends through a cable jacket recess 409 defined at the fiber distribution cable ends 407 of the body 402 and the cover piece 404. A plurality of embodiments of the grounding lug assembly 406 has been provided in U.S. patent application Ser. No. 11/157,561 (now U.S. Pat. No. 7,492,996), which was filed on Jun. 21, 2005 and is hereby incorporated by reference.

Figure 24:
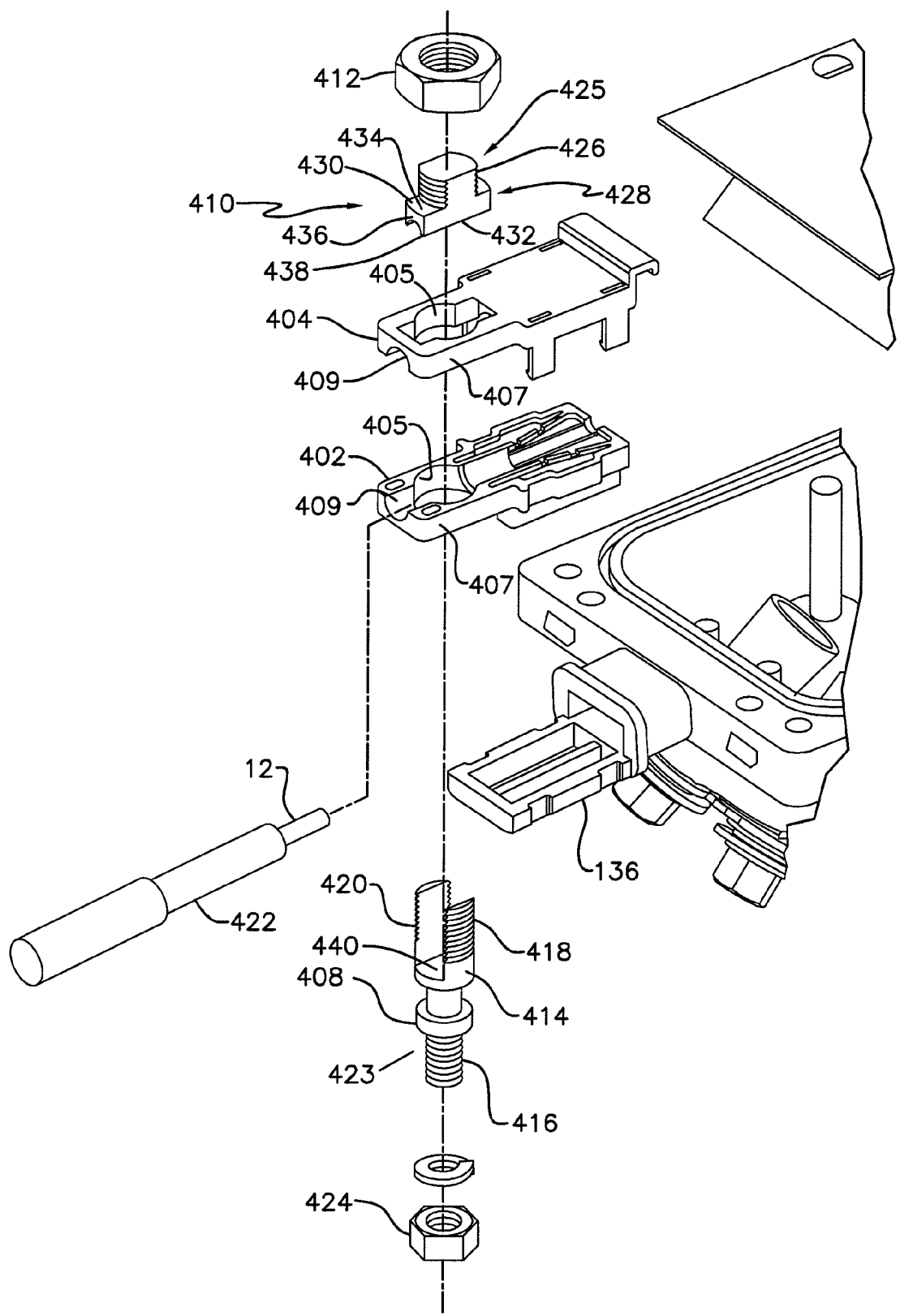
FIG. 24 is an exploded, fragmentary, perspective view of the retention device of FIG. 23.

Referring now to FIG. 24, the grounding lug assembly 406 includes a lug 408, a compression insert 410, and a nut 412. The lug 408 includes a first axial end portion 414 and a second axial end portion 416. In the subject embodiment, the first axial end portion 414 is bifurcated with external threads 418, which are adapted to engage with the nut 412, disposed on an outer surface of the first axial end portion 414. The first axial end portion 414 defines a cable slot 420 which is adapted to receive cable sheathing 422 that covers the fiber distribution cable 12. In the subject embodiment, cable sheathing 422 (or cable armor) is a sheathing that is made of steel or aluminum.

In the subject embodiment, the second axial end portion 416 of the lug 408 includes a plurality of threads 423 disposed on an outer surface of the second axial end portion 416. The plurality of threads 423 is adapted to threadedly engage internal threads disposed on a grounding nut 424. The second axial end portion 416 is adapted to engage a grounding wire (such as a #6 wire).

The compression insert 410 includes an upper portion 425 having curved end surfaces 426. The upper portion 425 fits within the nut 412 and has a slightly smaller diameter than the curvature of the external threads 418 on the first axial end portion 414 so as not to interfere with advancement of the nut 412 along the external threads 418.

The compression insert 410 further includes a lower portion 428 having a nut engaging surface 430 and a cable engaging surface 432. The nut engaging surface 430 includes a plurality of nut engaging tabs 434 that are configured for engaging the nut 412 as it advances along the external threads 418 of the first axial end portion 414.

The cable engaging surface 432 defines a cable recess 436 having a pair of shoulders 438 disposed along the cable recess 436. The cable recess 4 is adapted for receiving the cable sheathing 422 of the fiber distribution cable 12. The shoulders 438 are adapted to engage corresponding shoulders 440 disposed in the cable slot 420. The engagement of the shoulders 438 and the corresponding shoulders 440 prevents over compression of the fiber distribution cable 12, which might lead to damage of the optical fibers within the fiber distribution cable 12.

Figure 25:
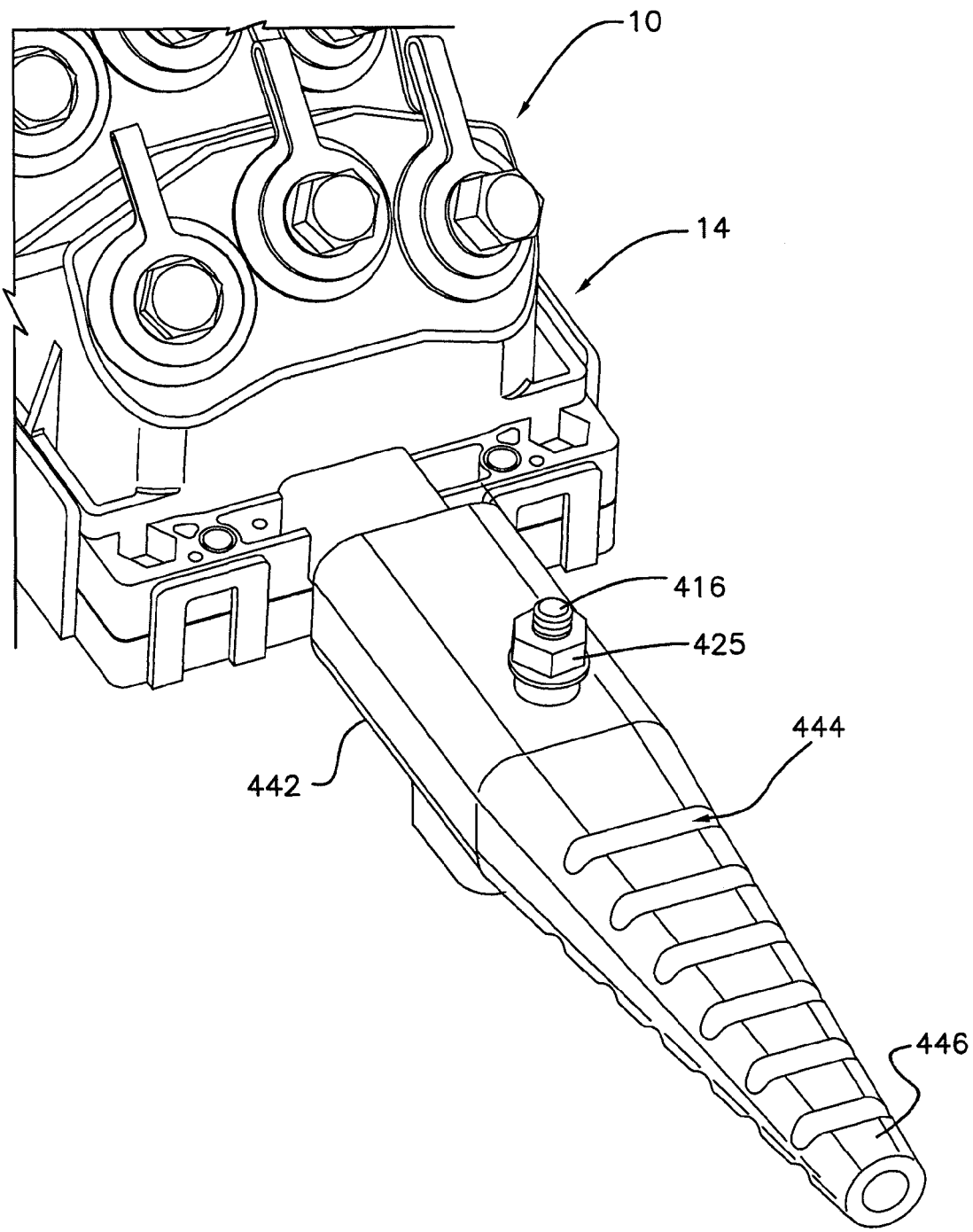
FIG. 25 is a perspective view of a protective boot suitable for use with the retention device of FIG. 23.

Referring now to FIG. 25, an alternate embodiment of a protective boot 442 is shown. The protective boot 442 is molded over the retention device 400, a portion of the tail piece 44 of the cover 18, and a portion of the grounding lug assembly 406 following the installation of the fiber distribution cable 12 and the multi-fiber optic cable 130 in the retention device 400. The protective boot 442 includes a plurality of strain relief grooves 444 disposed near a cable end 446 of the protective boot 442.

In the subject embodiment, the second axial end portion 416 and the grounding nut 425 are not over molded by the protective boot 442. This exposure of the second axial end portion 416 and the grounding nut 425 allows the cable sheathing 422 to be grounded by a grounding wire.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A terminal for mounting to a fiber distribution cable, comprising
a housing including:
  a base; and
  a cover connectedly engaged with the base, the cover and the base defining an interior cavity; and
a plurality of adapters adapted for outside environmental use disposed on the cover, each of the plurality of adapters including a first port for receiving a first fiber optic connector from outside the housing and a second port for receiving a second fiber optic connector from inside the housing, wherein the first ports are sealed to prevent moisture or water intrusion into the interior cavity of the housing, and wherein each of the first ports includes internal threads adapted to mate with corresponding threads of the first fiber optic connectors;
wherein the terminal has an adapter density that is greater than or equal to 0.48 adapters/in$^2$.

2. The terminal of claim 1, wherein the terminal has an adapter density that is greater than or equal to 0.57 adapters/in$^2$.

3. The terminal of claim 1, wherein the terminal has an adapter density that is greater than or equal to 0.96 adapters/in$^2$.

4. The terminal of claim 1, wherein the terminal has an adapter density that is greater than or equal to 1.14 adapters/in$^2$.

5. The terminal of claim 1, wherein the cover includes a plurality of angled steps with each angled step defining a plurality of mounting surfaces, and wherein adapters of the plurality of adapters are disposed on each of the angled steps such that one adapter is disposed on each mounting surface.

6. The terminal of claim 5, wherein the angled steps are configured on an outer surface of the cover in arcuate shaped rows.

7. The terminal of claim 5, wherein each angled step forms an oblique angle with the base and each mounting surface forms an oblique mating angle with an adjacent mounting surface on the angles step.

8. The terminal of claim 5, wherein the adapters being arcuately oriented on each of the angles steps.

9. The terminal of claim 1, wherein at least one of the plurality of adapters include an outer housing having a first end and a second end, wherein the first end is the first port having internal threads adapted to receive exterior threads of the first fiber optic connector.

10. The terminal of claim 9, wherein the outer housing of at least one of the plurality of adapters defines a sealing surface positioned inside the outer housing, the sealing surface being adapted to engage a sealing member of the first fiber optic connector when the first fiber optic connector is inserted within the first port.

* * * * *